US010185499B1

(12) United States Patent
Wang et al.

(10) Patent No.: US 10,185,499 B1
(45) Date of Patent: Jan. 22, 2019

(54) NEAR-MEMORY COMPUTE MODULE

(71) Applicant: Rambus Inc., Sunnyvale, CA (US)

(72) Inventors: David Wang, Santa Clara, CA (US);
Nirmal Saxena, Santa Clara, CA (US)

(73) Assignee: Rambus Inc., Sunnyvale, CA (US)

( * ) Notice: Subject to any disclaimer, the term of this patent is extended or adjusted under 35 U.S.C. 154(b) by 399 days.

(21) Appl. No.: 14/536,312

(22) Filed: Nov. 7, 2014

Related U.S. Application Data

(60) Provisional application No. 61/925,623, filed on Jan. 9, 2014, provisional application No. 61/924,608, filed on Jan. 7, 2014.

(51) Int. Cl.
*G06F 3/06* (2006.01)

(52) U.S. Cl.
CPC .......... *G06F 3/0611* (2013.01); *G06F 3/0625* (2013.01); *G06F 3/0659* (2013.01); *G06F 3/0673* (2013.01)

(58) Field of Classification Search
CPC .... G06F 3/0611; G06F 3/0625; G06F 3/0659; G06F 3/0673; G06F 3/0602; G06F 3/0607
See application file for complete search history.

(56) References Cited

U.S. PATENT DOCUMENTS

| | | | |
|---|---|---|---|
| 5,592,612 A | 1/1997 | Birk | |
| 6,128,094 A | 10/2000 | Smith | |
| 6,400,621 B2 | 6/2002 | Hidaka et al. | |
| 6,523,102 B1 * | 2/2003 | Dye | G06F 12/023 709/247 |
| 6,542,956 B1 | 4/2003 | Lee et al. | |
| 6,993,701 B2 | 1/2006 | Corbett et al. | |
| 7,656,727 B2 | 2/2010 | Thayer | |
| 7,990,746 B2 | 8/2011 | Rajan | |
| 8,325,554 B2 | 12/2012 | Sweere et al. | |
| 8,687,451 B2 | 4/2014 | Wang | |
| 9,202,548 B2 * | 12/2015 | Faber | G11C 13/0004 |
| 2003/0079073 A1 * | 4/2003 | Richard | G06F 3/0601 710/302 |

(Continued)

OTHER PUBLICATIONS

Office Action for U.S. Appl. No. 13/653,373, dated Mar. 27, 2014.
(Continued)

*Primary Examiner* — David Yi
*Assistant Examiner* — Tahilba O Puche
(74) *Attorney, Agent, or Firm* — Lowenstein Sandler LLP

(57) ABSTRACT

Disclosed herein are systems having an integrated circuit device disposed within an integrated circuit package having a periphery, and within this periphery a transaction processor is configured to receive a combination of signals (e.g., using a standard memory interface), and intercept some of the signals to initiate a data transformation, and forward the other signals to one or more memory controllers within the periphery to execute standard memory access operations (e.g., with a set of DRAM devices). The DRAM devices may or may not be in within the package periphery. In some embodiments, the transaction processor can include a data plane and control plane to decode and route the combination of signals. In other embodiments, off-load engines and processor cores within the periphery can support execution and acceleration of the data transformations.

19 Claims, 16 Drawing Sheets

(56) References Cited

U.S. PATENT DOCUMENTS

| | | |
|---|---|---|
| 2004/0123029 A1 | 6/2004 | Dalal et al. |
| 2005/0028038 A1* | 2/2005 | Pomaranski ........ G06F 11/2268 714/42 |
| 2006/0200697 A1 | 9/2006 | Ito |
| 2008/0104290 A1 | 5/2008 | Cowell et al. |
| 2008/0183959 A1 | 7/2008 | Pelley et al. |
| 2009/0024790 A1* | 1/2009 | Rajan ................. G11C 11/4063 711/105 |
| 2009/0141558 A1 | 6/2009 | Sarin et al. |
| 2009/0300259 A1 | 12/2009 | Luo et al. |
| 2010/0005212 A1 | 1/2010 | Gower et al. |
| 2010/0162037 A1 | 6/2010 | Maule et al. |
| 2010/0199125 A1 | 8/2010 | Reche |
| 2010/0274952 A1 | 10/2010 | Lee |
| 2011/0072200 A1 | 3/2011 | Lee et al. |
| 2011/0125990 A1 | 5/2011 | Khosravi et al. |
| 2011/0170329 A1 | 7/2011 | Kang |
| 2012/0151294 A1 | 6/2012 | Yoo et al. |
| 2012/0243299 A1 | 9/2012 | Shau |
| 2012/0257459 A1 | 10/2012 | Berke |
| 2012/0297231 A1 | 11/2012 | Qawami et al. |
| 2013/0060996 A1 | 3/2013 | Berke |
| 2013/0179724 A1* | 7/2013 | Cordero ................ G11C 29/76 714/6.3 |
| 2014/0040550 A1* | 2/2014 | Nale ................... G06F 13/1694 711/118 |
| 2014/0095947 A1* | 4/2014 | Mozak ................. G11C 29/56 714/718 |
| 2014/0237205 A1* | 8/2014 | Takefman ............. H03M 13/05 711/162 |
| 2016/0188500 A1* | 6/2016 | Morris ................ G06F 13/1673 711/154 |

OTHER PUBLICATIONS

Notice of Allowance for U.S. Appl. No. 13/558,332, dated Feb. 25, 2014.
Office Action for U.S. Appl. No. 13/620,288, dated Oct. 1, 2013.
Office Action for U.S. Appl. No. 13/791,814, dated May 1, 2014.
Office Action for U.S. Appl. No. 13/619,692, dated May 14, 2014.
Office Action for U.S. Appl. No. 13/620,288, dated May 15, 2014.
Office Action for U.S. Appl. No. 13/791,807, dated May 29, 2014.
Office Action for U.S. Appl. No. 14/178,241, dated Jun. 27, 2014.

* cited by examiner

NEAR-MEMORY COMPUTE MODULE

RELATED APPLICATIONS

The present application claims the benefit of priority to U.S. Patent Application No. 61/924,608, entitled "Near-Memory Compute Module", filed Jan. 7, 2014; and the present application claims the benefit of priority to U.S. Patent Application No. 61/925,623, entitled "Transactional Memory Controller", filed Jan. 9, 2014, both of which are hereby incorporated by reference in their entirety.

FIELD

This disclosure relates to the field of memory systems and more particularly to techniques for near-memory compute modules.

BACKGROUND

Many computing systems (e.g., servers, workstations, desktops, laptops, etc.) use memory or memory modules that can be inserted or plugged into a socket on a printed circuit board (e.g., motherboard or blade) of the computing system. The memory stores data accessible by a host controller and other components in the computing system, and a processor performs operations over the stored data. A common form of pluggable memory is the Dual In-line Memory Module (DIMM). DIMMs can contain multiple memory chips (e.g., Dynamic Random Access Memory or DRAM chips), each of which has a particular data bus width (e.g., 4 bits or 8 bits). For example, a DIMM may have eight 8-bit DRAM chips, or sixteen 4-bit DRAM chips, arranged in parallel to provide a total 64-bit wide data bus. Each arrangement of 64 data bits from parallel DRAM chips is called a rank. The memory arrays are further subdivided into addressable groups, rows, and columns. A data bus (e.g., DQ bus) is connected to the host controller to allow writing and reading of datasets to and from the DIMM. A command/address bus (e.g., CA bus) also runs between the host controller and each DIMM. The CA bus and DQ bus together form a system bus. The system bus and communication protocol between the host controller and DRAM chips is often standardized (e.g., following "the JEDEC DDR4 SDRAM standard", etc.) to ensure product interoperability and reduce costs for all the stakeholders in the computing business ecosystem.

As computing systems increase in performance, the amount of memory and complexity of the host boards (e.g., motherboards) also increases. This introduces several issues for legacy memory systems and architectures. For example, with an un-buffered DIMM (e.g., UDIMM), the CA bus is connected directly to every DRAM chip on the DIMM. As a result, there is a high electrical load (e.g., capacitive load) on the CA bus that is proportional to the product of the number of DRAM chips and the number of ranks. For the DQ bus, the electrical load is proportional to the number of ranks. Some legacy memory systems have employed buffering devices on or near the DRAM chips to boost the drive of the DQ and CA signals in the presence of high electrical loads. Even with such load reduction DIMMs (e.g., LRDIMMs), however, legacy memory systems have further limitations in capability and performance.

One such limitation is related to dataset access temporal and spatial locality. Temporal locality is a time-wise measure. One such measure depends from the time locality of two events. For example, how soon after a word of data (or other portion of a dataset) that word is accessed or expected to be accessed again. Spatial locality is a measure of how soon after a dataset at a given address location is accessed that another dataset at a relatively close address location is expected to be accessed.

In computing applications with low spatial and temporal locality (e.g., random querying or key-value indexing of large datasets), ongoing dataset accesses primarily move data into and out of the DIMMs (e.g., to facilitate data transformation operations performed in a processing element). In such applications (e.g., that exhibit low temporal and spatial locality), legacy memory systems expend more power in the process of data movement than in the data transformation operations. Moreover, legacy memory systems place high demands on the host controller during these data movement operations.

Techniques are needed to address the problem of implementing a memory system that exhibits improved power consumption as well as increased performance in such computing applications—yet without requiring a memory system or memory architecture re-design. None of the aforementioned legacy approaches achieve the capabilities of the herein-disclosed techniques. Therefore, there is a need for improvements.

SUMMARY

The present disclosure provides improved environments, methods, and systems suited to address the aforementioned issues with legacy approaches. More specifically, the present disclosure provides a detailed description of techniques used in memory systems including near-memory compute modules. The claimed embodiments address the problem of limited memory system scalability and performance (e.g., in computing applications with low temporal and spatial locality). More specifically, some claims are directed to approaches for implementing a memory system that exhibits high electrical load drive capability and increased performance (e.g., power and speed) in computing applications with low temporal and spatial locality, while maintaining product interoperability, which advances the technical fields for addressing the problem of limited memory system scalability and performance, as well as advancing peripheral technical fields.

Embodiments include an integrated circuit device disposed within an integrated circuit package having a periphery, and within this periphery a transaction processor is configured to receive a combination of signals (e.g., using a standard memory interface), and intercept some of the signals to initiate a data transformation, and forward the other signals to one or more memory controllers within the periphery to execute standard memory access operations (e.g., with a set of DRAM devices). The DRAM devices may or may not be in within the package periphery. In some embodiments, the transaction processor can include a data plane and control plane to decode and route the combination of signals. In other embodiments, off-load engines and processor cores within the periphery can support execution and acceleration of the data transformations.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings, described below, are for illustration purposes only. The drawings are not intended to limit the scope of the present disclosure.

DETAILED DESCRIPTION

Overview

Figure 1A:
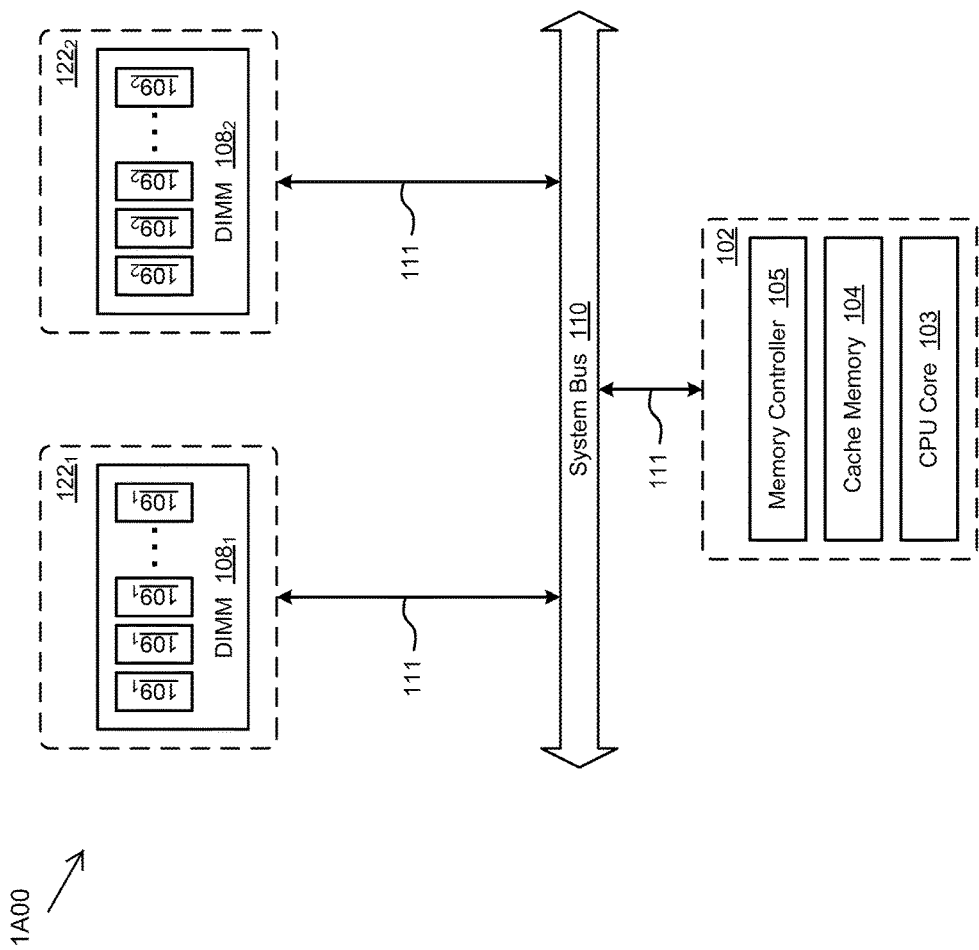
FIG. 1A is an environment showing a memory system for comparing to memory systems having a near-memory compute module.

Techniques are needed to address the problem of implementing a memory system that exhibits low power consumption and increased performance (e.g., improvements in power and speed) in computing applications with low temporal and spatial locality. More particularly, disclosed herein and in the accompanying figures are exemplary environments, methods, and systems for near-memory compute modules.

The disclosed techniques for near-memory compute modules provide memory interface signal buffering for memory system scalability, and also supports close proximity data transformation functions. Performing data transformation functions in close proximity to the memory devices is merely one aspect of the herein-disclosed system performance improvements. In some embodiments, the data transformations are provided by a module on the same device (e.g., SoC, multi-chip package, etc.) as the memory devices. The disclosed near-memory compute modules can also be configured to communicate with the host controller through standard memory interfaces (e.g., JEDEC DDR4 DRAM standard) or other standard interfaces (e.g., SerDes).

The problems attendant to very large memories is not limited to the need for performing data transformation functions in close proximity to the memory devices. Indeed, as computing systems increase in performance, the amount of memory and complexity of the host boards (e.g., motherboards) also increases. This introduces several issues for legacy memory systems and architectures. For example, with an un-buffered DIMM (e.g., UDIMM), certain busses are connected directly to every DRAM chip on the DIMM. As a result, there is a high electrical load (e.g., capacitive load) on such busses (e.g., a CA bus) that is proportional to the product of the number of DRAM chips and the number of ranks. For other busses such as the DQ bus, the electrical load is proportional to the number of ranks. Some legacy memory systems have employed buffering devices on or near the DRAM chips to boost the drive of the DQ and CA signals in the presence of high electrical loads. Yet, even with such load reduction DIMMs (e.g., LRDIMMs), very large memory footprints using legacy memory systems have further limitations in capability and performance, at least in that such large memory systems demand data transformation functions to be performed in close proximity to the memory devices themselves.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

The term "logic" means any combination of software or hardware that is used to implement all or part of the disclosure.

The term "non-transitory computer readable medium" refers to any medium that participates in providing instructions to a logic processor.

A "module" includes any mix of any portions of computer memory and any extent of circuitry including circuitry embodied as a processor.

Reference is now made in detail to certain embodiments. The disclosed embodiments are not intended to be limiting of the claims.

DESCRIPTIONS OF EXEMPLARY EMBODIMENTS

FIG. 1A is an environment 1A00 showing a memory system for comparing to systems having a near-memory compute module. As shown in FIG. 1A, environment 1A00 comprises a host controller 102, a first DIMM $108_1$, and a second DIMM $108_2$. Host controller 102 further comprises a CPU core 103, a cache memory 104, and a memory controller 105. Host controller 102 can also comprise multiple instances each of CPU core 103, cache memory 104, and memory controller 105. Host controller 102 of environment 1A00 can further be based on various architectures (e.g., Intel x86, ARM, MIPS, IBM Power, etc.). Cache memory 104 can be dedicated to CPU core 103 or shared with other cores. First DIMM $108_1$ comprises, in part, a first set of memory chips $109_1$ (e.g., eight DDR4 SDRAM chips). Second DIMM $108_2$ also comprises, in part, a second set of memory chips $109_2$. Host controller 102 communicates with DIMMs $108_1$ and $108_2$ through a system bus 110 in order to write and read datasets to and from memory chips $109_1$ and $109_2$ on DIMMs $108_1$ and $108_2$, respectively. Host controller 102 is coupled to DIMMs $108_1$ and $108_2$ through system bus 110 using a standard physical interface 111 (e.g., compliant with the JEDEC DDR4 SDRAM standard, Serial ATA SerDes standard, etc.).

Figure 1B:
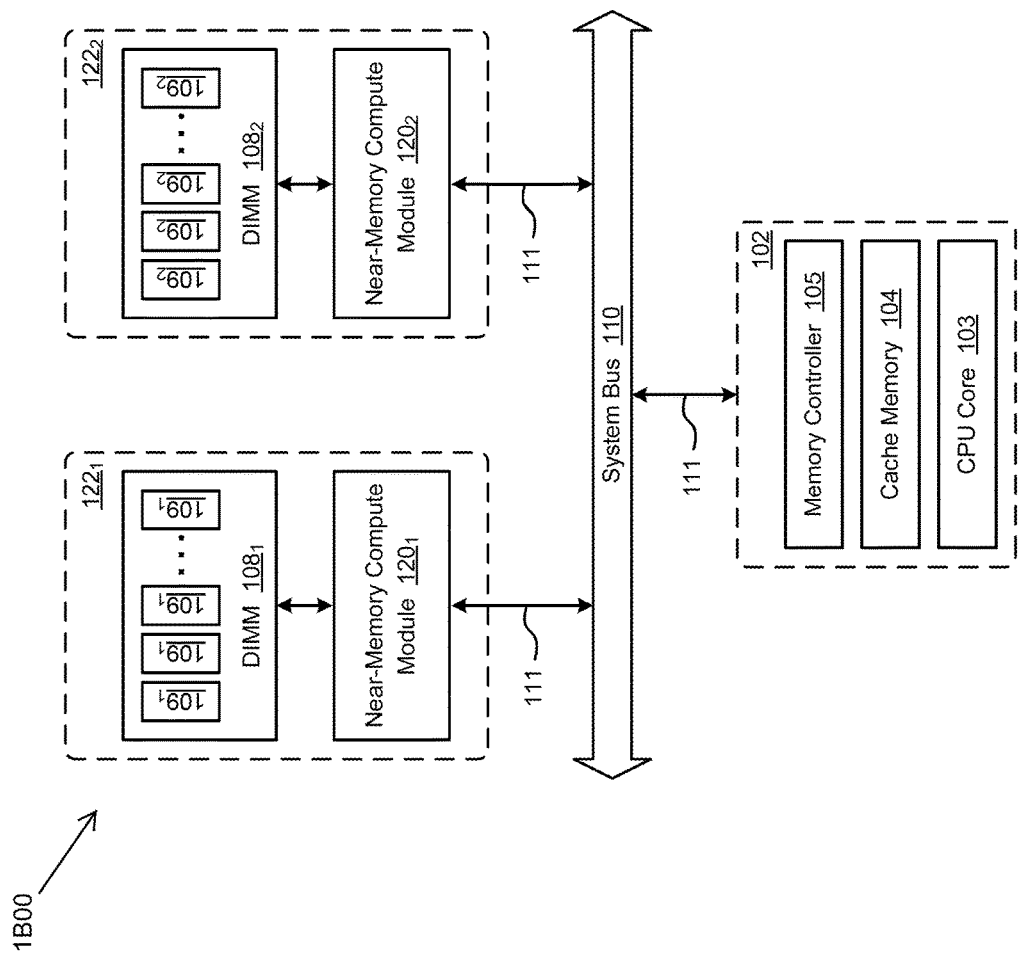
FIG. 1B is an environment showing a memory system including a near-memory compute module, according to one embodiment.

FIG. 1B is an environment 1B00 showing a memory system including a near-memory compute module. As an option, one or more instances of environment 1B00 or any aspect thereof may be implemented in the context of the architecture and functionality of the embodiments described herein. Also, environment 1B00 or any aspect thereof may be implemented in any desired environment.

As shown in FIG. 1B, environment 1B00 comprises all of the components and infrastructure shown in environment 1A00, plus a first near-memory compute module $120_1$, and a second near-memory compute module $120_2$. Modules $120_1$ and $120_2$ are sometimes termed "near-memory" due to their close physical and electrical proximity to memory chips $109_1$ and $109_2$, respectively. In environment 1B00, near-memory compute modules $120_1$ and $120_2$ are on the same printed circuit board or substrate as DIMMs $108_1$ and $108_2$ to form a first compute DIMM (CDIMM) $122_1$ and a second compute DIMM (CDIMM) $122_2$, respectively. In some embodiments, the near-memory compute module can comprise one device (e.g., system-on-chip or SoC), multiple devices in a single package or printed circuit board, multiple separate devices, can be integrated into the memory chips, and can have other variations, modifications, and alternatives.

Host controller 102 is coupled to CDIMMs $122_1$ and $122_2$ through system bus 110 and standard physical interface 111 as in environment 1A00. Host controller 102 can also continue to write and read datasets to and from memory chips $109_1$ and $109_2$. Near-memory compute modules $120_1$ and $120_2$ in environment 1B00 can offer additional capabilities beyond that of the system in environment 1A00. For example, modules $120_1$ and $120_2$ can provide buffering to boost the drive of the DQ and CA signals on system bus 110. Also, modules $120_1$ and $120_2$ can initiate data transformation operations for datasets stored in memory chips $109_1$ and $109_2$ based on data sent from host controller 102 (e.g., commands, operands, etc.). Further, modules $120_1$ and $120_2$ can accelerate data transformation operations (e.g., compress operations, uncompress operations, encryption operations, decryption operations, Galois field arithmetic operations, hashing and/or indexing operations, etc.) through parallel background processing that is performed within the boundaries of CDIMMs $122_1$ and $122_2$.

The shown CDIMMs $122_1$ and $122_2$ use a standard physical interface 111 to communicate with host controller 102. Architectural changes to CPU core 103, memory controller 105, system bus 110, and other components are not required. Use of such an interface to CDIMM $122_1$ and CDIMM $122_2$ supports product interoperability and, in some embodiments, this arrangement serves to conserve board area. Further, with data transformation operations or computing in close proximity to memory chips $109_1$ and $109_2$, less power will be expended in data movement. Additional background computing capability within CDIMM $122_1$ and CDIMM $122_2$ will also allow some tasks to be offloaded from host controller 102 so it can attend to other compute bound operations. By taking advantage of the parallel processing opportunities of the near-memory computing architecture, many computing system performance speed-ups are achievable. Systems with near-memory compute capability can be very beneficial for both structured applications (e.g., in-memory database management) and non-structured applications (e.g., "big data"), as well as in other applications.

Figure 2A:
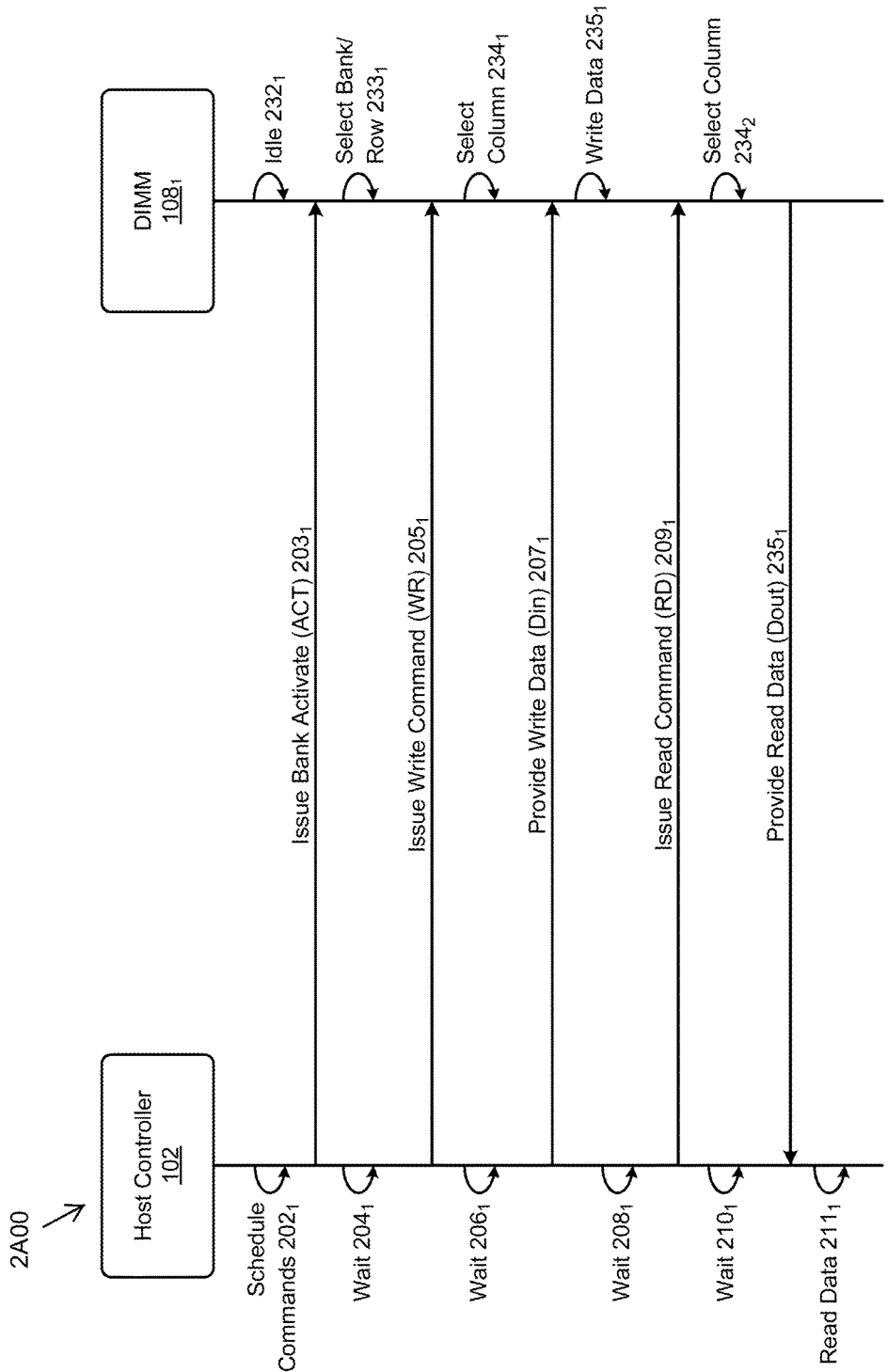
FIG. 2A is a diagram showing communications between a host controller and a DIMM for comparing to memory systems having a near-memory compute module, according to some embodiments.

FIG. 2A is a diagram 2A00 showing communications between a host controller and a DIMM for comparing to memory systems having a near-memory compute module. As an option, one or more instances of diagram 2A00 or any aspect thereof may be implemented in the context of the architecture and functionality of the embodiments described herein. Also, diagram 2A00 or any aspect thereof may be implemented in any desired environment.

As shown in FIG. 2A, diagram 2A00 presents example operations and communications on and among host controller 102 and DIMM $108_1$. Specifically, diagram 2A00 depicts a memory write operation followed by a memory read operation. More specifically, host controller 102 and DIMM $108_1$ can be designed and configured to enable host controller 102 to schedule memory commands $202_1$ (e.g., by memory controller 105 based on instructions from CPU core 103) while memory chips $109_1$ of DIMM $108_1$ are waiting in an idle state $232_1$. In this example and for the embodiment depicted in diagram 2A00, memory chips $109_1$ of DIMM $108_1$ are all waiting in idle state $232_1$. In other examples and embodiments the DIMMs can be in various other states (e.g., refreshing, active power down, pre-charge power down, reading, writing, etc.). Host controller 102 can then issue a bank activate command (ACT) $203_1$ to DIMM $108_1$. Bank activate command $203_1$ will open or activate a row in a particular bank of a particular rank of DIMM $108_1$ for subsequent access. Bank activate command $203_1$ is executed, in part, by host controller 102 providing a certain combination of signals (e.g., chip select, bankgroup select, bank select, row address, etc.) on system bus 110. Upon receiving bank activate command $203_1$, DIMM $108_1$ will select the bank and row $233_1$ specified in bank activate command $203_1$. After a wait time $204_1$, host controller 102 can issue a write command (WR) $205_1$ to DIMM $108_1$. Write command $205_1$ is executed, in part, by host controller 102 providing a certain combination of signals (e.g., column address, etc.) on system bus 110. Upon receiving write command $205_1$, DIMM $108_1$ will select the column $234_1$ of the activated bank and row. After a wait time $206_1$, host controller 102 will provide write data (Din) $207_1$ on system bus 110. DIMM $108_1$ will then sense dataset Din on system bus 110 and write data $235_1$ to the selected memory address to complete the memory write operation.

After a wait time $208_1$, host controller 102 can issue a read command (RD) $209_1$ to DIMM $108_1$. Read command $209_1$ is executed, in part, by host controller 102 providing a certain combination of signals (e.g., column address, etc.) on system bus 110. In this example, the memory read operation is targeting the same rank, bank, and row activated with bank activate command $203_1$ and no additional precharging or activating commands are required. Upon receiving read command $209_1$, DIMM $108_1$ will select the column $234_2$ of the activated bank and row. After a wait time $210_1$, DIMM $108_1$ will provide read data (Dout) $235_1$ on system bus 110. Host controller 102 will then sense dataset Dout on system bus 110 and read data $211_1$ to complete the memory read operation.

In some embodiments and environments, wait times $204_1$, $206_1$, $208_1$, and $210_1$ can be of varying but known duration to, in part, accommodate for the inherent electrical response time or latency associated with accessing datasets on memory chips $109_1$. When the durations of wait times $204_1$, $206_1$, $208_1$, and $210_1$ are known, memory controller 105 of host controller 102 can schedule commands $202_1$ that account for the required delays between commands and operations. For a JEDEC DDR4 SDRAM standard physical interface 111, for example, wait time $206_1$ (e.g., write latency or WL) is specified as 9 clock cycles when operating at 1600 MT/s with no additive latency (AL). For the same JEDEC DDR4 SDRAM standard physical interface 111, wait time $210_1$ (e.g., read latency or RL) is specified as 11 clock cycles when operating at 1600 MT/s with no additive latency.

Figure 2B:
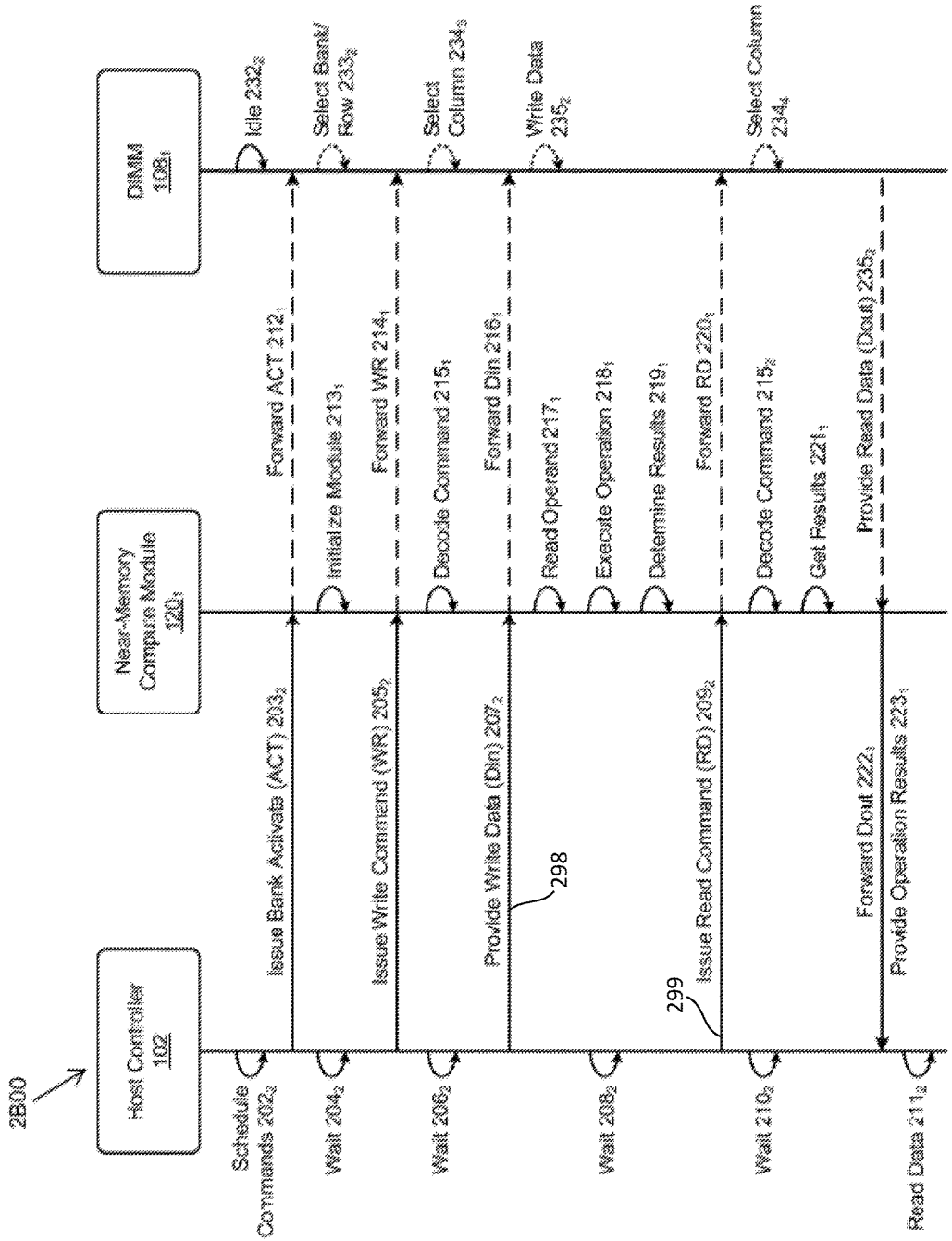
FIG. 2B is a diagram showing communications among a host controller, a near-memory compute module, and a DIMM, as used in memory systems having a near-memory compute module, according to some embodiments.

FIG. 2B is a diagram 2B00 showing communications among a host controller, a near-memory compute module, and a DIMM, as used in memory systems having a near-memory compute module. As an option, one or more instances of diagram 2B00 or any aspect thereof may be implemented in the context of the architecture and functionality of the embodiments described herein. Also, diagram 2B00 or any aspect thereof may be implemented in any desired environment.

As shown in FIG. 2B, diagram 2B00 presents example operations and communications on and among host controller 102, near-memory compute module $120_1$, and DIMM $108_1$ from diagram 1B00 of FIG. 1B in some embodiments. Specifically, diagram 2B00 depicts a transaction or data transformation operation utilizing a single operand that is initiated and executed by near-memory compute module $120_1$. Diagram 2B00 further depicts a memory write operation and memory read operation (e.g., such as that depicted and described in diagram 2A00 of FIG. 2A) when near-memory compute module $120_1$ is present. More specifically, host controller 102 and DIMM $108_1$ can be designed and configured to enable host controller 102 to schedule memory commands $202_2$ (e.g., by memory controller 105 based on instructions from CPU core 103) while memory chips $109_1$ of DIMM $108_1$ are waiting in an idle state $232_2$. For this example and embodiment depicted in diagram 2B00, memory chips $109_1$ of DIMM $108_1$ are all waiting in idle state $232_2$, but can also be in various other states (e.g., refreshing, active power down, pre-charge power down, reading, writing, etc.) in other examples and embodiments. Host controller 102 can then issue a bank activate command (ACT) $203_2$ to near-memory compute module $120_1$. The combination of signals (e.g., chip select, bankgroup select, bank select, row address, etc.) provided by host controller 102 on system bus 110 during bank activate $203_2$ will, in part, cause near-memory compute module $120_1$ to either forward ACT command $212_1$ from host controller 102 directly to DIMM $108_1$, or initialize module $213_1$ for subsequent activity (e.g., receiving instructions and data for transactions or operations). If DIMM $108_1$ receives the forwarded bank activate command $203_2$ (e.g., from forward ACT $212_1$), DIMM $108_1$ will select the bank and row $233_2$ specified in bank activate command $203_2$. After a wait time $204_2$, host controller 102 can issue a write command (WR) $205_2$ to near-memory compute module $120_1$. The combination of signals (e.g., column address, etc.) provided by host controller 102 on system bus 110 during write command $205_2$ will, in part, cause near-memory compute module $120_1$ to either forward WR command $214_1$ from host controller 102 directly to DIMM $108_1$, or intercept and decode command $215_1$. If DIMM $108_1$ receives forwarded write command $205_2$ (e.g., from forward WR 2140, DIMM $108_1$ will select the column $234_3$ of the activated bank and row. If near-memory compute module $120_1$ intercepts write command $205_2$, the near-memory compute module $120_1$ will decode command $215_1$ to determine (e.g., from a look-up table, etc.) a set of instructions (e.g., to read data, to launch subroutine, etc.) that the near-memory compute module $120_1$ can execute. After a wait time $206_2$, host controller 102 will provide write data (Din) $207_2$ to near-memory compute module $120_1$. If near-memory compute module $120_1$ has forwarded bank activate $203_2$ and write command $205_2$ directly to DIMM $108_1$, near-memory compute module $120_1$ will also forward Din $216_1$ directly to DIMM $108_1$. DIMM $108_1$ will then write data $235_2$ to the selected memory address to complete the same memory write operation as depicted and described in diagram 2A00 of FIG. 2A.

Here, the provided write data (Din) $207_2$ is a portion 298 of signals used to initiate a data transformation. If near-memory compute module $120_1$ has intercepted bank activate $203_2$ and write command $205_2$, near-memory compute module $120_1$ will also read operand $217_1$ for subsequent transactions or operations by sensing the provided write data (Din) $207_2$ from host controller 102. Near-memory compute module $120_1$ will then execute operation $218_1$ according to the instructions and data determined from the previously received decode command $215_1$ and read operand $217_1$, respectively. Operation $218_1$ is performed to determine results $219_1$.

After a wait time $208_2$, host controller 102 can issue a read command (RD) $209_2$ to near-memory compute module $120_1$. The combination of signals (e.g., column address, etc.) provided by host controller 102 on system bus 110 during read command $209_2$ will, in part, cause near-memory compute module $120_1$ to either forward RD command $220_1$ from host controller 102 directly to DIMM $108_1$, or intercept and decode command $215_2$. Strictly as examples:

If DIMM $108_1$ receives forwarded read command $209_2$ (e.g., from forward RD $220_1$), DIMM $108_1$ will select the column $234_4$ of the activated bank and row. Here, forwarded read command $209_2$ is a portion 299 of signals used to initiate execution of a memory access operation.

If near-memory compute module $120_1$ intercepts read command $209_2$, near-memory compute module $120_1$ will decode command $215_2$ to determine (e.g., from a look-up table, etc.) a set of instructions (e.g., to access memory, to provide data, etc.) near-memory compute module $120_1$ will execute.

Near-memory compute module $120_1$ will then get results $221_1$ according to the instructions and information determined from previous steps decode command $215_2$ and determine results $219_1$. After a wait time $210_2$, host controller 102 will expect data to be provided on system bus 110. If DIMM $108_1$ receives forwarded read command $209_2$ (e.g., from forward RD$220_1$), DIMM $108_1$ will provide read data (Dout) $235_2$ and near-memory compute module $120_1$ will then forward Dout $222_1$ to system bus 110 to complete the memory read operation as depicted and described in diagram 2A00 of FIG. 2A.

If near-memory compute module $120_1$ has intercepted read command $209_2$, near-memory compute module $120_1$ will then provide operation results $223_1$ to system bus 110. Host controller 102 will then sense the dataset on system bus 110 and read data $211_2$ for use in subsequent operations and processing at CPU core 103. Near-memory compute module $120_1$ can use memory chips $109_1$ on DIMM $108_1$ to support operations (e.g., steps $212_1$, $213_1$, $214_1$, $215_1$, $216_1$, $217_1$, $218_1$, $219_1$, $220_1$, $215_2$, $221_1$, $222_1$, and $223_1$). For example, memory chips $109_1$ on DIMM $108_1$ can store command look-up tables, software driver payloads, operands, operation results, etc.

In some embodiments and in some environments, wait times $204_2$, $206_2$, $208_2$, and $210_2$ can be of varying known durations. The wait times accommodate the inherent electrical response time or latency associated with accessing datasets on memory chips $109_1$. When the durations of wait times $204_2$, $206_2$, $208_2$, and $210_2$ are known, memory controller 105 of host controller 102 can schedule commands $202_2$ that account for the required delays between commands and operations. For a JEDEC DDR4 SDRAM standard physical interface 111, for example, wait time $206_2$ (e.g., write latency or WL) is specified as 9 clock cycles when operating at 1600 MT/s with no additive latency. For the same JEDEC DDR4 SDRAM standard physical interface 111, wait time $210_2$ (e.g., read latency or RL) is specified as 11 clock cycles when operating at 1600 MT/s with no additive latency.

Diagram 2B00 in comparison to diagram 2A00 further shows the product interoperability of the herein-described near-memory compute module $120_1$. Specifically, host controller 102 activity (e.g., steps $202_2$, $203_2$, $204_2$, $205_2$, $206_2$, $207_2$, $208_2$, $209_2$, $210_2$, and $211_2$) in diagram 2B00 with near-memory compute module $120_1$ has the same characteristics (e.g., sequence, function, etc.) as host controller 102 activity (e.g., steps $202_1$, $203_1$, $204_1$, $205_1$, $206_1$, $207_1$, $208_1$, $209_1$, $210_1$, and $211_1$, respectively) in diagram 2A00 with no near-memory compute module $120_1$. Similarly, DIMM $108_1$ activity (e.g., steps $232_2$, $233_2$, $234_3$, $235_2$, $234_4$, $207_2$, and $235_2$) in diagram 2B00 with near-memory compute module $120_1$ has the same characteristics (e.g., sequence, function, etc.) as DIMM $108_1$ activity (e.g., steps $232_1$, $233_1$, $234_1$, $235_1$, $234_2$, and $235_1$, respectively) in diagram 2A00 with no near-memory compute module $120_1$. Near-memory compute module $120_1$ can provide additional capability (e.g., steps $212_1$, $213_1$, $214_1$, $215_1$, $216_1$, $217_1$, $218_1$, $219_1$, $220_1$, $215_2$, $221_1$, $222_1$, and $223_1$) while maintaining standard DIMM $108_1$ capability (e.g., memory write and memory read operations in diagram 2A00). Still further, the environment 1B00 and diagram 2B00 in comparison to the environment 1A00 and diagram 2A00, respectively, show near-memory compute module $120_1$ can provide additional capability without requiring changes to standard physical interface 111 and the related communications protocol. More specifically, for example, wait time $206_2$ in diagram 2B00 with near-memory compute module $120_1$ can be the same (e.g., 9 clock cycles) as wait time $206_1$ in environment 2A00 without near-memory compute module $120_1$. When near-memory compute module $120_1$ requires extended wait times for certain transactions and operations, variable latency settings (e.g., additive latency and parity latency in JEDEC DDR4 SDRAM standard) can be deployed as needed. The timing attributes of standard physical interface will be described in more detail in FIG. 3 and the associated disclosure.

Figure 2C:
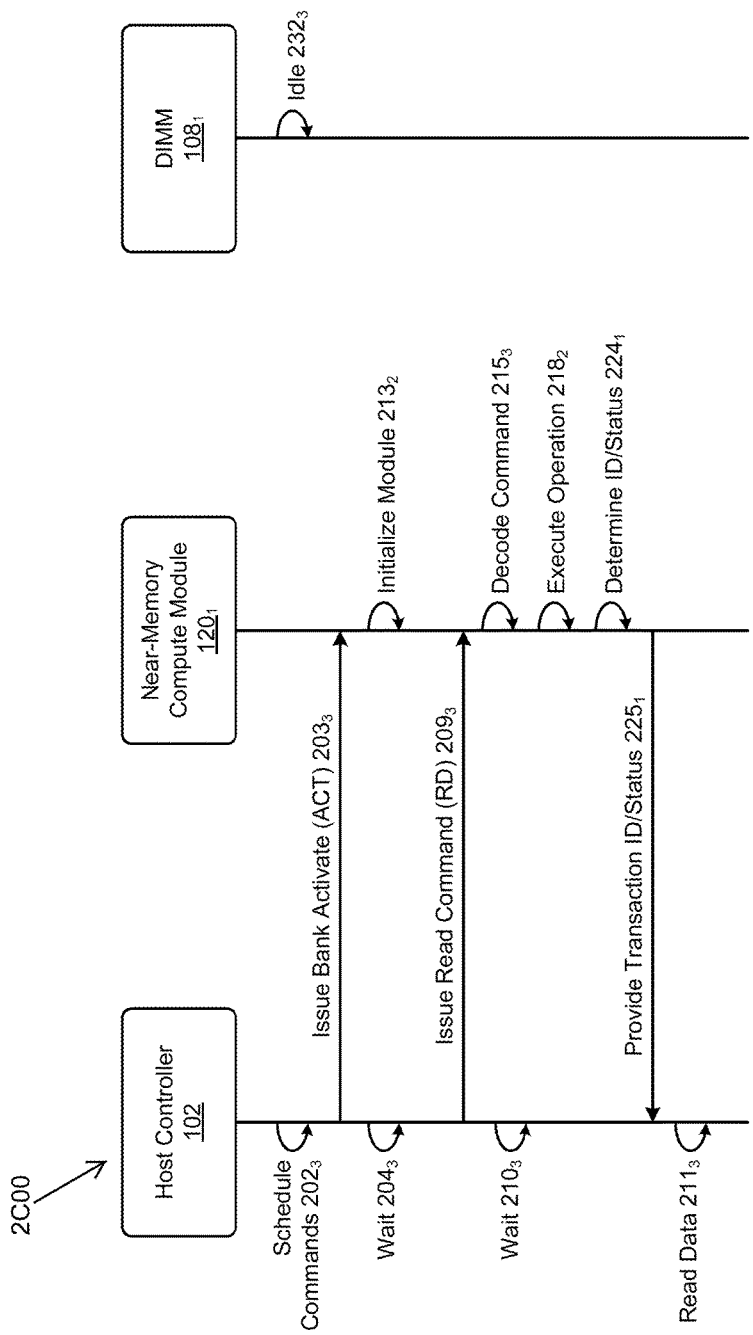
FIG. 2C is a diagram showing additional example communications among a host controller, a near-memory compute module, and a DIMM, as used in memory systems having a near-memory compute module, according to some embodiments.

FIG. 2C is a diagram 2C00 showing additional example communications among a host controller, a near-memory compute module, and a DIMM, as used in memory systems having a near-memory compute module. As an option, one or more instances of diagram 2C00 or any aspect thereof may be implemented in the context of the architecture and functionality of the embodiments described herein. Also, diagram 2C00 or any aspect thereof may be implemented in any desired environment.

As shown in FIG. 2C, diagram 2C00 presents example operations and communications on and among host controller 102, near-memory compute module $120_1$, and DIMM $108_1$ from diagram 1B00 of FIG. 1B in some embodiments. Specifically, diagram 2C00 depicts a transaction or data transformation operation that is initiated and executed by near-memory compute module $120_1$, and for which a transaction ID (e.g., tag) and/or status is provided by near-memory compute module $120_1$. More specifically, host controller 102 and DIMM $108_1$ can be designed and configured to enable host controller 102 to schedule memory commands $202_3$ (e.g., by memory controller 105 based on instructions from CPU core 103) while memory chips $109_1$ of DIMM $108_1$ are waiting in an idle state $232_3$. Host controller 102 can then issue a bank activate command (ACT) $203_3$ to near-memory compute module $120_1$. The combination of signals (e.g., chip select, bankgroup select, bank select, row address, etc.) provided by host controller 102 on system bus 110 during bank activate $203_2$ will, in part, cause near-memory compute module $120_1$ to initialize module $213_2$ for subsequent activity (e.g., receiving instructions and data for transactions or operations). After a wait time $204_3$, host controller 102 can issue a read command (RD) $209_3$ to near-memory compute module $120_1$. The combination of signals (e.g., column address, etc.) provided by host controller 102 on system bus 110 during read command $209_3$ will, in part, cause near-memory compute module $120_1$ to intercept and decode command $215_3$. Near-memory compute module $120_1$ will decode command $215_3$ to determine (e.g., from a look-up table, etc.) a set of instructions (e.g., to access memory, to provide data, etc.) near-memory compute module $120_1$ will execute. Near-memory compute module $120_1$ will then execute operation $218_2$ according to, in part, the instructions determined from previous step decode command $215_3$. In one example, the duration of the operation launched in execute operation $218_2$ can be significantly longer than a wait time $210_3$ (e.g., read latency or RL of 11 clock cycles) and host controller 102 will expect other information (e.g., transaction ID, transaction tag, transaction status, etc.) rather than operation results from near-memory compute module $120_1$ after wait time $210_3$. In this example, near-memory compute module $120_1$ will then determine transaction ID and/or status $224_1$ and provide transaction ID and/or status $225_1$ on system bus 110. After wait time $210_3$ following issue read command (RD) $209_4$, host controller 102 will sense the dataset on system bus 110 and read data $211_3$ for use in subsequent operations and processing at CPU core 103. The near-memory compute module $120_1$ can use memory chips $109_1$ on DIMM $108_1$ to support operations (e.g., steps $213_2$, $215_3$, $218_2$, $224_1$, and $225_1$). For example, memory chips $109_1$ on DIMM $108_1$ can store command look-up tables, software driver payloads, operation results, transaction IDs, and the like.

Figure 2D:
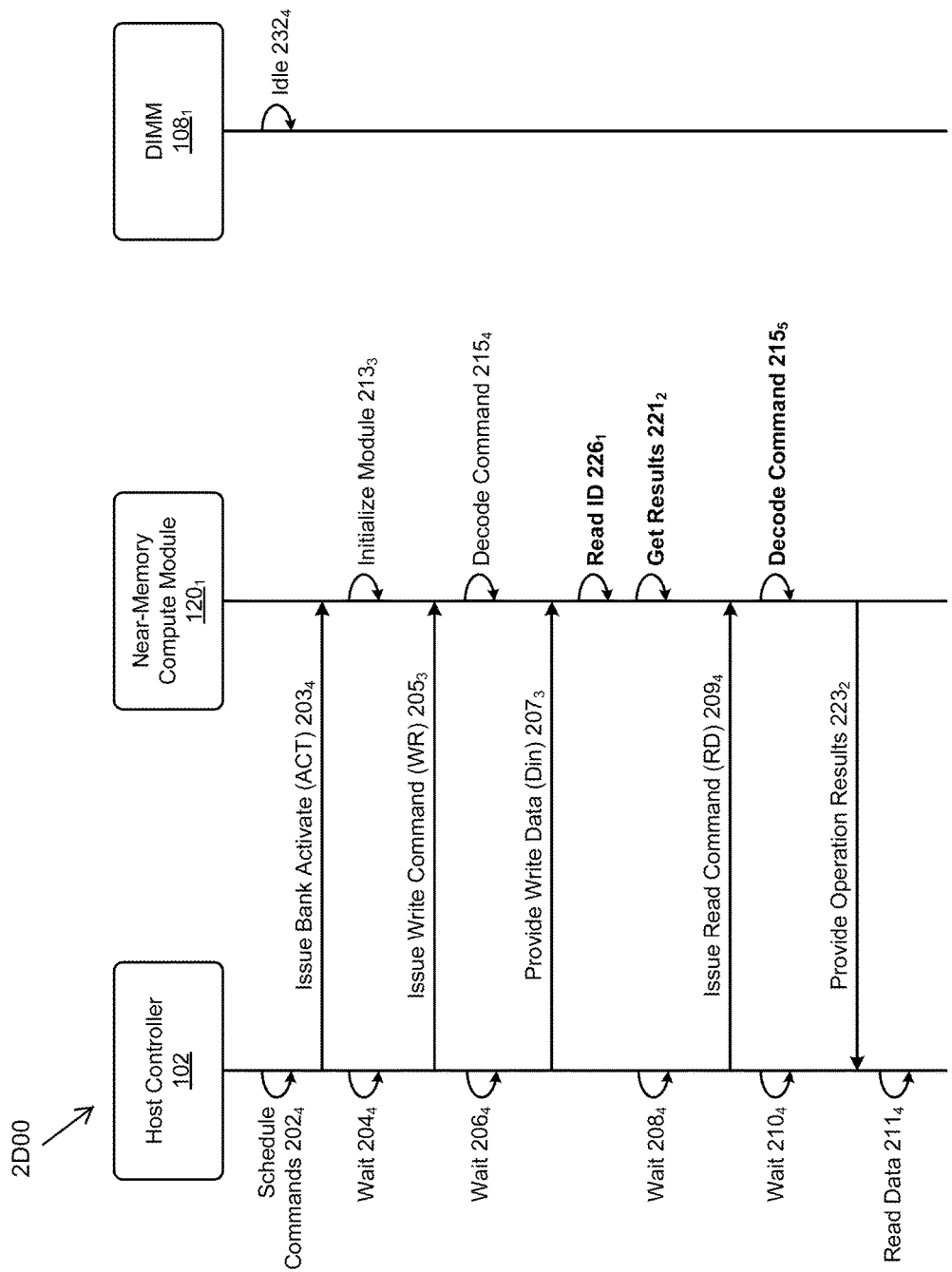
FIG. 2D is a diagram showing additional example communications among a host controller, a near-memory compute module, and a DIMM, as used in memory systems having a near-memory compute module, according to some embodiments.

FIG. 2D is a diagram 2D00 showing additional example communications among a host controller, a near-memory compute module, and a DIMM, as used in memory systems having a near-memory compute module. As an option, one or more instances of diagram 2D00 or any aspect thereof may be implemented in the context of the architecture and functionality of the embodiments described herein. Also, diagram 2D00 or any aspect thereof may be implemented in any desired environment.

As shown in FIG. 2D, diagram 2D00 presents example operations and communications on and among host controller 102, near-memory compute module $120_1$, and DIMM $108_1$ from diagram 1B00 of FIG. 1B in some embodiments. Specifically, diagram 2D00 depicts a request for transaction or operation results from a previous transaction or operation initiated and executed by near-memory compute module $120_1$. More specifically, host controller 102 and DIMM $108_1$ can be designed and configured to enable host controller 102 to schedule memory commands $202_4$ (e.g., by memory controller 105 based on instructions from CPU core 103) while memory chips $109_1$ of DIMM $108_1$ are waiting in an idle state $232_4$. Host controller 102 can then issue a bank activate command (ACT) $203_4$ to near-memory compute module $120_1$. The combination of signals (e.g., chip select, bankgroup select, bank select, row address, etc.) provided by host controller 102 on system bus 110 during bank activate $203_4$ will, in part, cause near-memory compute module $120_1$ to initialize module $213_3$ for subsequent activity (e.g., receiving instructions and data for transactions or operations). After a wait time $204_4$, host controller 102 can issue a write command (WR) $205_3$ to near-memory compute module $120_1$. The combination of signals (e.g., column address, etc.) provided by host controller 102 on system bus 110 during write command $205_3$ will, in part, cause near-memory compute module $120_1$ to intercept and decode command $215_4$. Near-memory compute module $120_1$ will decode command $215_4$ to determine (e.g., from a look-up table, etc.) a set of instructions (e.g., to read data, to launch subroutine, etc.) near-memory compute module $120_1$ will execute. After a wait time $206_4$, host controller 102 will provide write data (Din) $207_3$ to near-memory compute module $120_1$. In this example, decode command $215_4$ determined near-memory compute module $120_1$ should expect a transaction ID to be provided by host controller 102 at step $207_3$. Near-memory compute module $120_1$ will then read ID $226_1$ and get results $221_2$ according to, in part, the instructions and data determined from previous steps decode command $215_4$ and read ID $226_1$, respectively.

After a wait time $208_4$, host controller 102 can issue a read command (RD) $209_4$ to near-memory compute module $120_1$. The combination of signals (e.g., column address, etc.) provided by host controller 102 on system bus 110 during read command $209_4$ will, in part, cause near-memory compute module $120_1$ to intercept and decode command $215_5$. Near-memory compute module $120_1$ will decode command $215_4$ to determine (e.g., from a look-up table, etc.) a set of instructions (e.g., to access memory, to provide data, etc.) near-memory compute module $120_1$ will execute. Near-memory compute module $120_1$ will then provide operation results $223_2$ on system bus 110 according to, in part, the instructions determined from previous steps decode command $215_5$ and get results $221_2$. After wait time $210_4$ following issue read command (RD) $209_4$, host controller 102 will sense the dataset on system bus 110 and read data $211_4$ for use in subsequent operations and processing at CPU core 103. Though not shown in diagram 2D00, near-memory compute module $120_1$ can use memory chips $109_1$ on DIMM $108_1$ to support operations (e.g., steps $213_3$, $215_4$, $226_1$, $221_2$, $215_5$, and $223_2$). For example, memory chips $109_1$ on DIMM $108_1$ can store command look-up tables, software driver payloads, operation results, transaction IDs, and the like.

Figure 3:
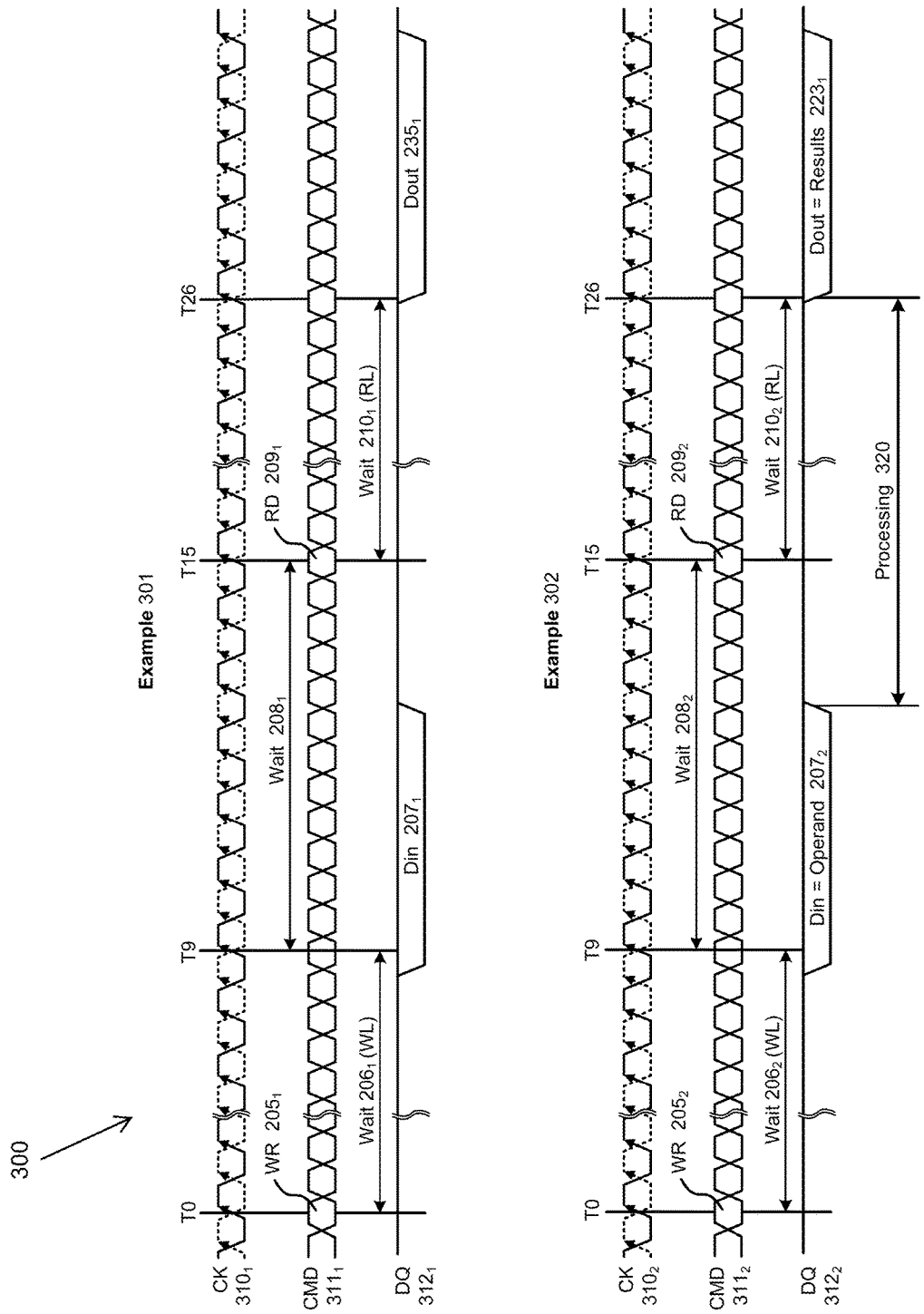
FIG. 3 presents annotated timing diagrams for memory systems having a near-memory compute module in comparison to memory systems not having a near-memory compute module, according to some embodiments.

FIG. 3 presents annotated timing diagrams 300 for memory systems having a near-memory compute module in comparison to memory systems not having a near-memory compute module. As an option, one or more instances of timing diagrams 300 or any aspect thereof may be implemented in the context of the architecture and functionality of the embodiments described herein. Also, timing diagrams 300 or any aspect thereof may be implemented in any desired environment.

As shown in FIG. 3, timing diagrams 300 comprises signal timing sequences for a first example 301 and a second example 302. First example 301 represents signal timing sequences for systems having no near-memory compute module, such as shown in environment 1A00 of FIG. 1A. Specifically, example 301 represents signal timing sequences for the memory write operation followed by the memory read operation as shown in diagram 2A00. Second example 302 represents signal timing sequences for systems having one or more near-memory compute modules, such as shown in environment 1B00 of FIG. 1B. Specifically, example 302 represents signal timing sequences for the transaction or data transformation operation utilizing a single operand initiated and executed by near-memory compute module $120_1$ as shown in diagram 2B00. In both examples 301 and 302, and in reference to environments 1A00 and 1B00, the signals and timing are represented as provided on system bus 110 with standard physical interface 111 based on the JEDEC DDR4 SDRAM standard. Other reference points and physical interface standards can be applied in other examples and embodiments.

More specifically, example 301 comprises a clock signal (CK) $310_1$, a command signal (CMD) $311_1$, and a data signal (DQ) $312_1$. CK $310_1$ represents a differential clock signal (e.g., CK_t and CK_c) on which the system timing is based. CMD $311_1$ represents a combination of signals (e.g., RAS_n, CAS_n, WE_n, etc.) that define a command provided to a receiving component in the system (e.g, host controller 102, DIMM $108_1$, etc.). DQ $312_1$ represents a bi-directional data bus on which datasets are transferred among components in the system. At time TO, write command (WR) $205_1$ will be issued on CMD $311_1$ to initiate the write operation. After wait time $206_1$, dataset Din $207_1$ will be available on DQ $312_1$. As shown, Din $207_1$ is first available at T9, or 9 clock cycles after WR $205_1$ (e.g., the WL when operating at 1600 MT/s with no additive latency). After wait time $208_1$ and at time T15, read command (RD) $209_1$ will be issued on CMD $311_1$ to initiate the read operation. After wait time $210_1$, dataset Dout $235_1$ will be available on DQ $312_1$. As shown, Dout $235_1$ is first available at T26, or 11 clock cycles after RD $209_1$ (e.g., the RL when operating at 1600 MT/s with no additive latency). Wait time $208_1$ is represented in example 301 as six clock cycles in duration, but can vary depending on several factors (e.g., dataset length, bank selection, etc.).

Example 302 in comparison to example 301 will show that having near-memory compute module $120_1$ in the memory system can have no impact on the timing and signaling requirements of standard physical interface 111, providing additional capability without costly changes to the memory system architecture. More specifically, example 302 comprises a clock signal (CK) $310_2$, a command signal (CMD) $311_2$, and a data signal (DQ) $312_2$. CK $310_2$ represents a differential clock signal (e.g., CK_t and CK_c) on which the system timing is based. CMD $311_2$ represents a combination of signals (e.g., RAS_n, CAS_n, WE_n, etc.) that define a command provided to a receiving component in the system (e.g, host controller 102, DIMM $108_1$, near-memory compute module $120_1$, etc.). DQ $312_2$ represents a bi-directional data bus on which datasets are transferred among components in the system. At time T0, write command (WR) $205_2$ will be issued on CMD $311_2$ to initiate the transaction. After wait time $206_2$, dataset Din $207_2$ will be available on DQ $312_2$. In example 302 and diagram 2B00, Din $207_2$ represents the operand to be used by near-memory compute module $120_1$ in the transaction. As shown, Din $207_2$ is first available at T9, or 9 clock cycles after WR $205_2$ (e.g., the WL when operating at 1600 MT/s with no additive latency). After wait time $208_2$ and at time T15, read command (RD) $209_2$ will be issued on CMD $311_2$ to initiate the read results operation. After wait time $210_2$, dataset Dout $223_1$ will be available on DQ $312_2$. In example 302 and diagram 2B00, Dout $223_1$ represents the results of the transaction or operation executed by near-memory compute module $120_1$. As shown, Dout $223_1$ is first available at T26, or 11 clock cycles after RD $209_2$ (e.g., the RL when operating at 1600 MT/s with no additive latency). Wait time $208_2$ is represented in example 302 as six clock cycles in duration, but can vary depending on several factors (e.g., dataset length, bank selection, etc.). Further, example 302 shows a processing 320 of the transaction or operation at near-memory compute module $120_1$ will occur during the time after Din $207_2$ (e.g., the operand) is received and before Dout $223_1$ (e.g., the results) are expected. In other examples and embodiments, processing 320 can begin earlier in the timing sequence (e.g., background processing).

Figure 4A:
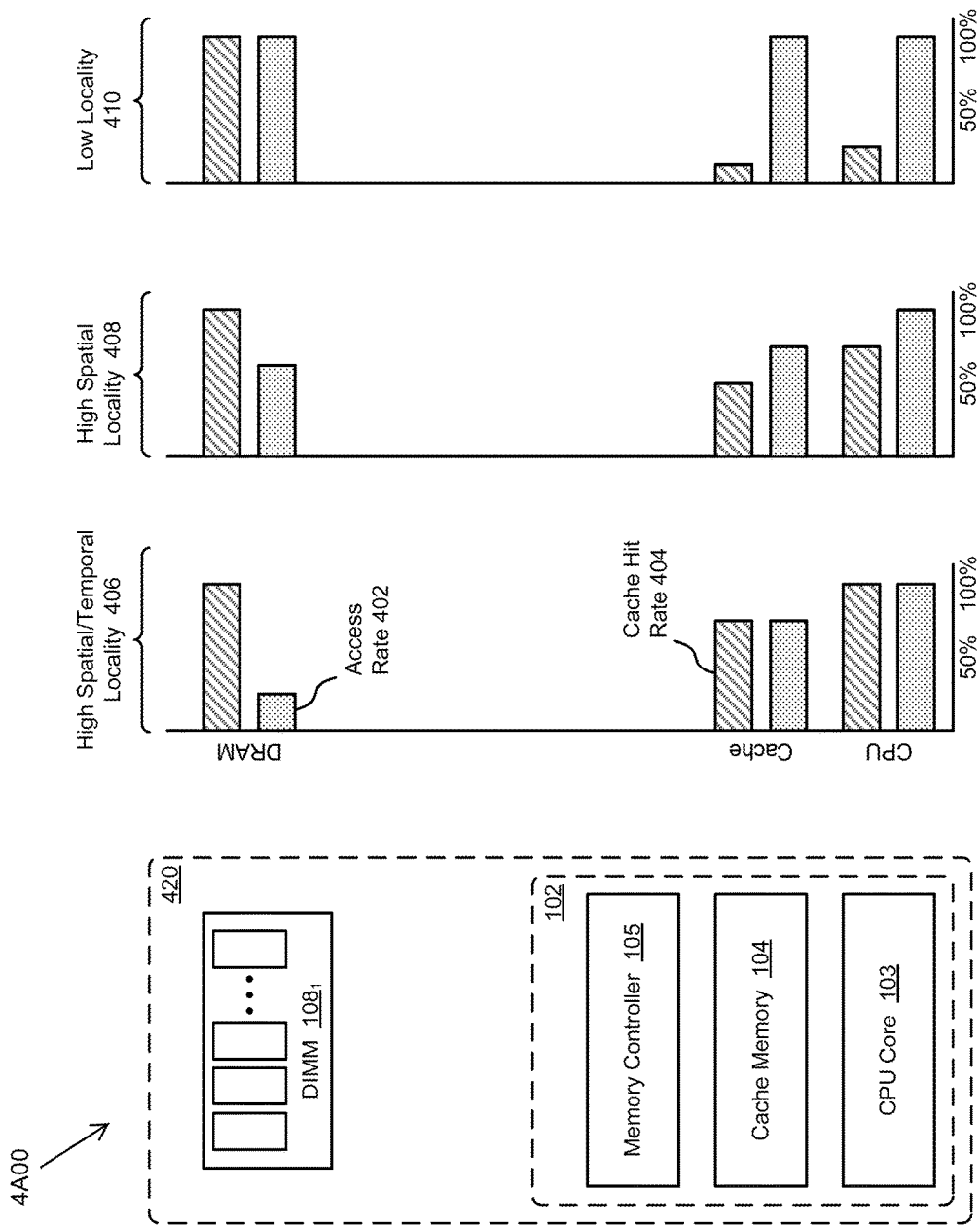
FIG. 4A is a diagram depicting varying spatial and temporal locality present in memory systems having near-memory compute module.

FIG. 4A is a diagram 4A00 depicting varying spatial and temporal locality present in memory systems having near-memory compute module. As an option, one or more instances of diagram 4A00 or any aspect thereof may be implemented in the context of the architecture and functionality of the embodiments described herein. Also, diagram 4A00 or any aspect thereof may be implemented in any desired environment.

As shown in FIG. 4A, diagram 4A00 depicts a memory system 420 comprising host controller 102 and DIMM $108_1$, configured as described in environment 1A00 of FIG. 1A. Diagram 4A00 further comprises a first bar chart 406 representing attributes of memory system 420 when exhibiting high spatial locality and high temporal locality, a second bar chart 408 representing attributes of memory system 420 when exhibiting high spatial locality, and a third bar chart 410 representing attributes of memory system 420 when exhibiting low locality. Bar charts 406, 408, and 410 depict a memory access rate 402 and a cache hit rate 404 for CPU core 103 (CPU), cache memory 104 (Cache), and DIMM $108_1$ (DRAM).

Architectures such as are shown for memory system 420 that have a separation between CPU core 103 and DIMM $108_1$ and use multiple levels or hierarchies (e.g., L1, L2, and L3) of cache memory 104 are effective for computing applications with runtime datasets that fit within the capacity of cache memory 104. These applications have a high degree of temporal and spatial locality for dataset accesses as represented in bar chart 406. High temporal and spatial locality results in high cache hit rates 404 and increases the responsiveness of such computing applications. In other computing applications that have only high spatial locality (e.g., video streaming) as represented in bar chart 408, various techniques (e.g., cache prefetching algorithms) can be deployed to mitigate the impact of relative (e.g., compared to cache memory 104) access latency of DIMM $108_1$. In computing applications with low spatial and temporal locality (e.g., random querying or key-value indexing of large datasets) as represented in bar chart 410, dataset access will bypass cache memory 104 and primarily require data movement to and from DIMM $108_1$ for data transformation operations. Legacy memory systems used in such applications require more power to be expended in data movement than in data transformation operations. Legacy memory systems will also tie up the host controller during these data movement and transformation operations, further limiting the performance of the computing system.

Figure 4B:
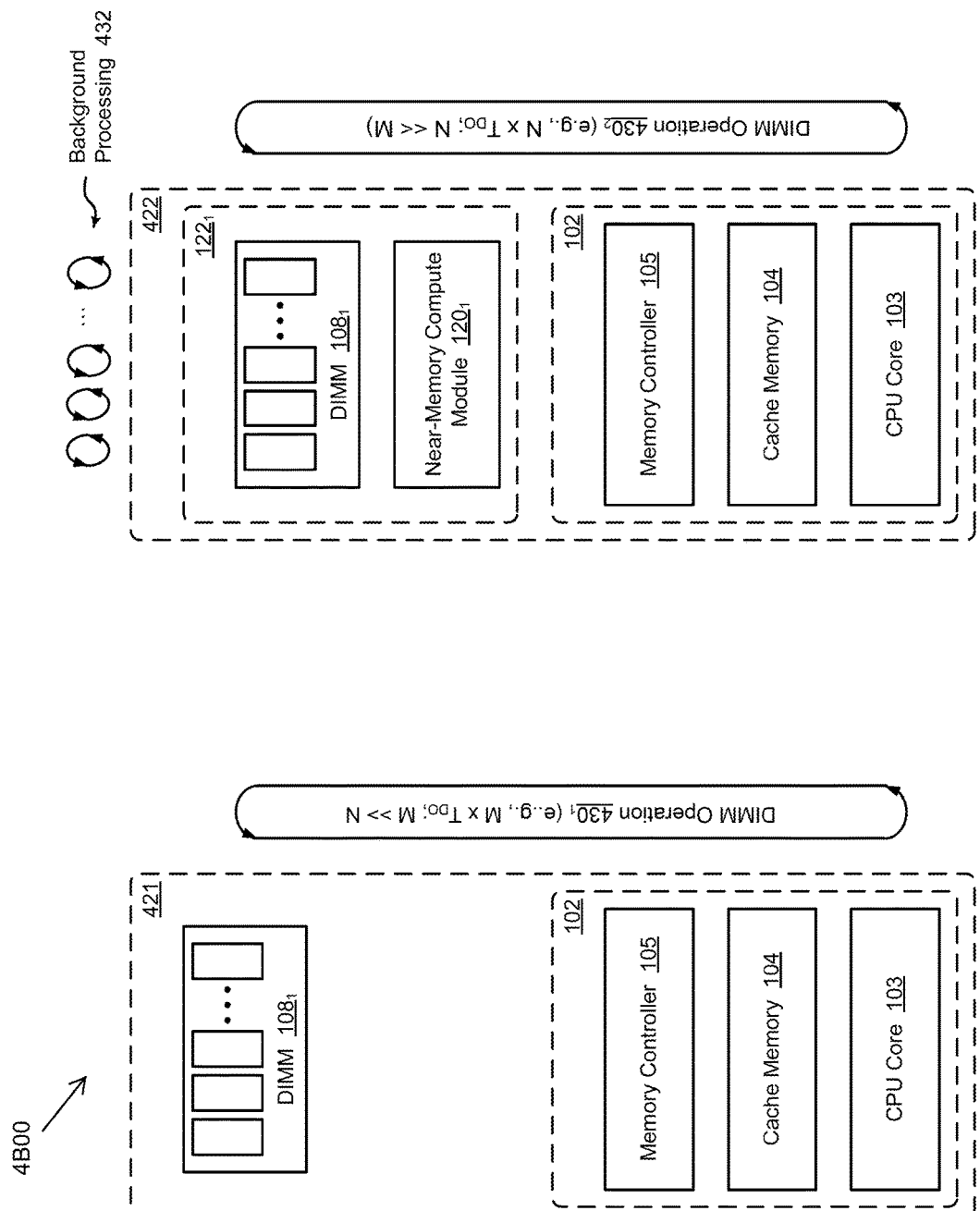
FIG. 4B is a diagram showing performance improvements when using a near-memory compute module, according to some embodiments.

FIG. 4B is a diagram 4B00 showing performance improvements when using a near-memory compute module. As an option, one or more instances of diagram 4B00 or any aspect thereof may be implemented in the context of the architecture and functionality of the embodiments described herein. Also, diagram 4B00 or any aspect thereof may be implemented in any desired environment.

As shown in FIG. 4B, diagram 4B00 depicts a first memory system 421 comprising host controller 102 and DIMM $108_1$, configured as described in environment 1A00 of FIG. 1A. Diagram 4B00 further depicts a second memory system 422 comprising host controller 102 and CDIMM $122_1$, configured as described in environment 1B00 of FIG. 1B. CDIMM $122_1$ further comprises near-memory compute module $120_1$. In both memory systems 421 and 422, CPU core 103 can complete an operation requiring DIMM access $430_1$ and $430_2$, respectively, in a time $T_{DO}$ (e.g., 100 ns). In computing applications with low spatial and temporal locality, memory system 421 will need to access DIMM $430_1$ a large number of times (e.g., M=1000) to complete a given set of operations or instructions at CPU core 103. In contrast, memory system 422 with near-memory compute module $120_1$ will need a much smaller number (e.g., N=100) of DIMM operations $430_2$ to complete the same set of operations or instructions at CPU core 103. The reduction in DIMM operations for memory system 422 is enabled, in part, by the ability of near-memory compute module $120_1$ to initiate background processing 423 of transactions and operations local to DIMM $108_1$ of CDIMM $122_1$. Specifically, background processing 423 can execute operations requiring DIMM access in a much shorter time $T_{BP}$ (e.g., 25 ns) relative to time $T_{DO}$, and can execute operations in parallel (e.g., P=8 operations in parallel) to yield an effective operation execution time of $T_{BP} \div P$ (e.g., 3.125 ns). Further, with data transformation operations or computing in close proximity to memory chips $109_1$ and $109_2$, less power will be expended in data movement. Additional background computing capability within CDIMMs $122_1$ and $122_2$ will also allow some tasks to be offloaded from host controller 102 so it can attend to other compute bound operations. The parallel, background, and near-memory computing capability provided by near-memory compute module $120_1$, can offer significant computing and memory system performance speed-ups.

Figure 5:
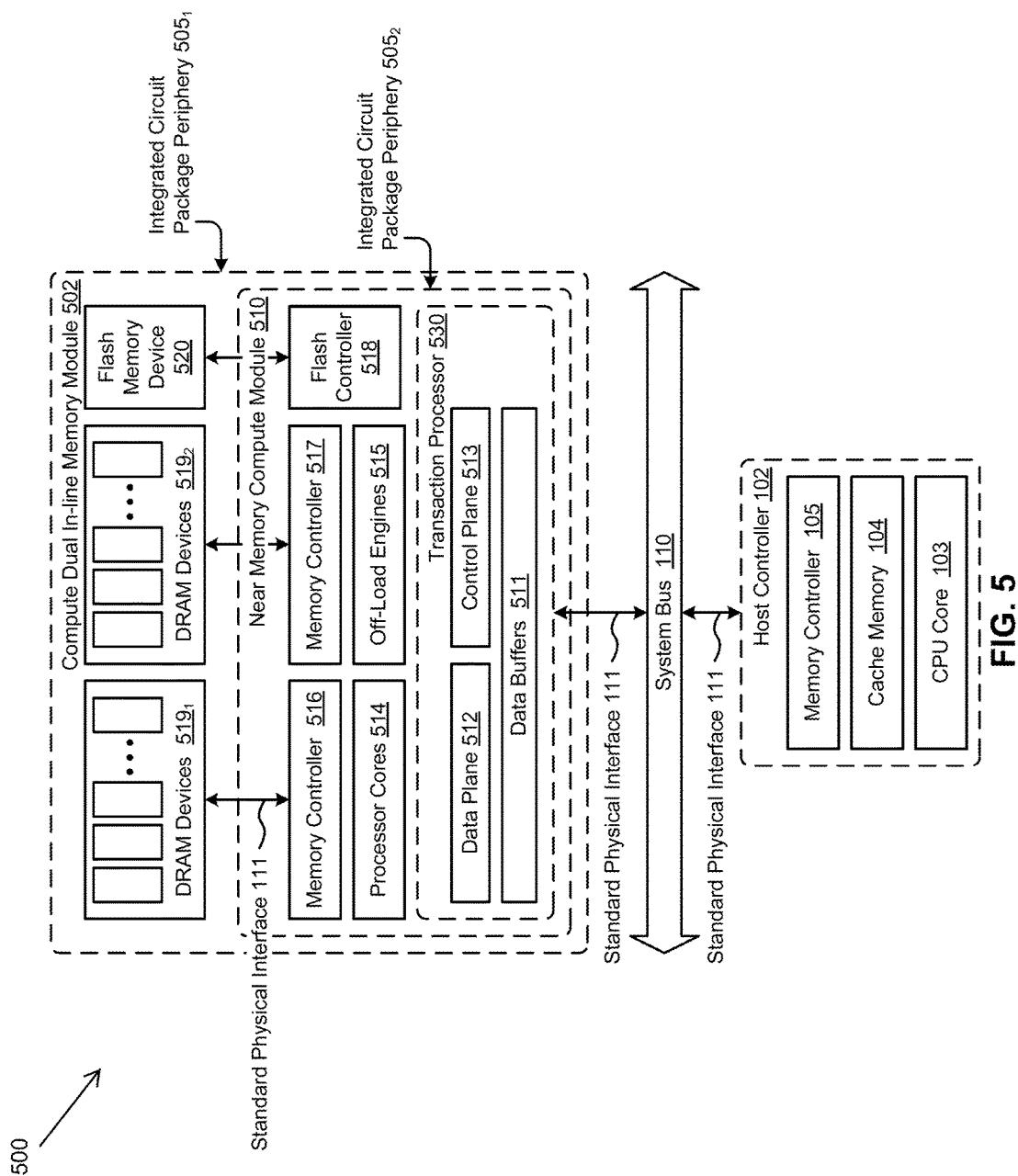
FIG. 5 depicts an environment showing components of a near-memory compute module, according to one embodiment.

FIG. 5 depicts an environment 500 showing components of a near-memory compute module. As an option, one or more instances of environment 500 or any aspect thereof may be implemented in the context of the architecture and functionality of the embodiments described herein. Also, environment 500 or any aspect thereof may be implemented in any desired environment.

As shown in FIG. 5, environment 500 comprises host controller 102, system bus 110, and standard physical interface 111 of environment 1B00 of FIG. 1B. Environment 500 further comprises a CDIMM 502 coupled to host controller 102 through system bus 110 and standard physical interface 111 (e.g., compliant with the JEDEC DDR4 SDRAM standard, Serial ATA SerDes standard, etc.). Still further, CDIMM 502 comprises a near-memory compute module 510 coupled to a first set of DRAM devices $519_1$, a second set of DRAM devices $519_2$, and a flash memory device 520 (e.g., comprising a single flash memory device or multiple flash memory devices). Near-memory compute module 510 further comprises a transaction processor 530, a set of processor cores 514, a set of off-load engines 515, a first memory controller 516, a second memory controller 517, and a flash controller 518, wherein transaction processor 530 includes a set of data buffers 511, a data plane memory (e.g., within data plane module 512), and a control plane memory (e.g., within control plane module 513). In some embodiments, CDIMM 502 can comprise one device (e.g., system-on-chip or SoC), multiple devices in a single package or printed circuit board, multiple separate devices, and can have other variations, modifications, and alternatives. In one embodiment, CDIMM 502 can be implemented in a first integrated circuit package having a periphery $505_1$. In another embodiment, near-memory compute module 510 can be implemented in a second integrated circuit package having a periphery $505_2$.

CDIMM 502 drives and receives signals to and from system bus 110, respectively, at data buffers 511. Data buffers 511 can provide buffering to boost the drive of the signals (e.g., DQ, CA, RA, etc.) on system bus 110 to help mitigate high electrical loads of large computing and memory systems. Various implementations of data buffers 511 can allow CDIMM 502 to be configured to emulate or appear as a UDIMM, RDIMM, LRDIMM, or other type of DIMM to host controller 102, increasing the interoperability of CDIMM 502 with other DIMMs.

Data plane 512 and control plane 513 together decode and route information for CDIMM 502. In some embodiments, data plane 512 and control plane 513 can be implemented in SRAM and appear as regular system physical memory to host controller 102. Data plane 512 stores the payload of a software driver that decodes commands and initiates transactions or data transformation operations using information provided on system bus 110 and by control plane 513. IMDB applications other applications can control operations of the CDIMM 502 by sending commands to the control plane 513, which the CDIMM 502 accepts and uses to operate on data stored in the data plane 512. Some transactions or data transformation operations from data plane 512 using commands from control plane 513 are launched on processor cores 514 and off-load engines 515. For example, processor cores 514 can execute a data transformation operation for dataset objects stored in the plurality of DRAM devices 519. Processor cores 514 can also interface with off-load engines 515 inside CDIMM 502 to accelerate data transformation operations (e.g., compress, uncompress, encrypt, decrypt, Galois field arithmetic, hash index calculations, etc.).

Memory controllers 516 and 517 interface with DRAM devices $519_1$ and DRAM devices $519_2$, respectively. In some embodiments, at least one memory controller (e.g., memory controller 516) can communicate with at least one set of DRAM devices (e.g., DRAM devices $519_1$) using standard physical interface 111. The plurality of DRAM devices 519 can be various types (e.g., DRR4, DDR3, LPDDR3, etc.) as these devices are decoupled from host controller 102 and managed only by memory controllers 516 and 517 of CDIMM 502. Memory controllers 516 and 517 also have advanced error checking and correction (ECC) configurations to support high reliability error correction and repair for the plurality of DRAM devices 519. This is possible since the plurality of DRAM devices 519 on CDIMM 502 are not directly accessible by host controller 102. The configuration of the plurality of DRAM devices $519_1$ is reported upon boot-up by the BIOS to the kernel software through the ACPI data structures. Flash controller 518 interfaces with flash memory device 520 on CDIMM 502. In some embodiments, flash memory device 520 can be NAND flash devices, but flash memory device 520 can also represent other non-volatile memory types (e.g., PCM, ReRAM). Processor cores 514 can also provide firmware support for flash controller 518.

In one example, CDIMM 502 can be deployed for in-memory database (IMDB or in-memory compute) applications. IMDB is a database management system that primarily relies on main memory (e.g., the plurality of DRAM devices 519) for computer data storage. IMDB systems are faster than disk storage databases since the internal optimization algorithms are simpler and execute fewer CPU instructions. Accessing data in main memory is significantly faster than accessing data in disk storage, providing for higher performance (e.g., speed and predictability) of the memory system and IMDB application. CDIMM 502 can further improve performance in IMDB applications through near-memory and parallel computing capabilities. IMDB systems have increased in popularity, especially in the data analytics space, since the mid-2000s due to decreasing DRAM costs. Applications with critical response requirements (e.g., telecommunications network equipment, mobile advertising networks, etc.) and applications with non-structured or flexible database schemas (e.g., NoSQL database MongoDB, etc.) can deploy IMDB and CDIMM 502 to improve responsiveness and performance.

Figure 6:
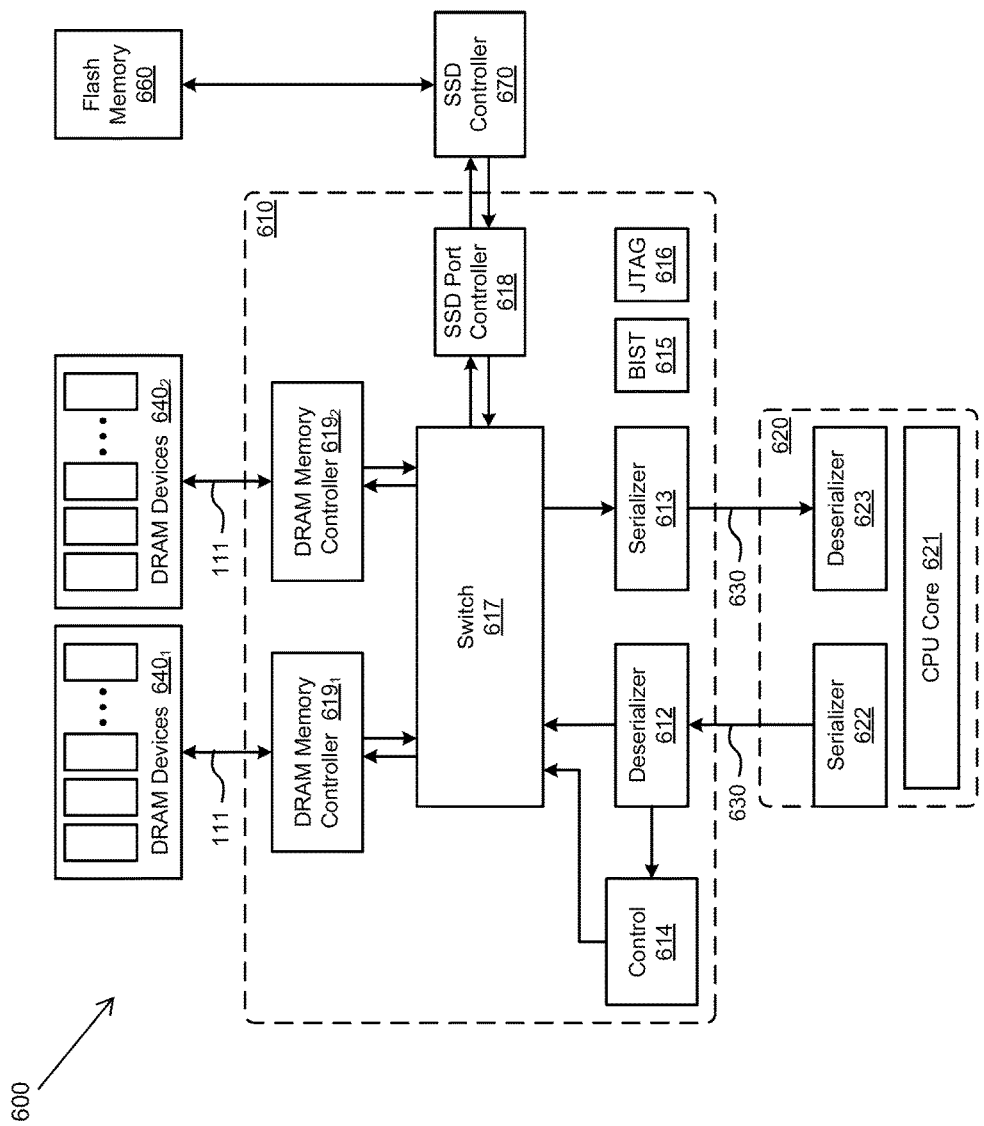
FIG. 6 depicts an environment including a transactional memory controller implemented as a near-memory compute module, according to one embodiment.

FIG. 6 depicts an environment 600 including a transactional memory controller implemented as a near-memory compute module. As an option, one or more instances of environment 600 or any aspect thereof may be implemented in the context of the architecture and functionality of the embodiments described herein. Also, environment 600 or any aspect thereof may be implemented in any desired environment.

As shown in FIG. 6, environment 600 comprises a transactional memory controller (TMC) device 610, a host controller 620, a first set of DRAM devices $640_1$ (e.g., DDR4 SDRAM devices), a second set of DRAM devices $640_2$ (e.g., DDR4 SDRAM devices), a solid-state drive (SSD) controller 670, and a flash memory 660 (e.g., comprising a single flash memory device, multiple flash memory devices, or other non-volatile memory devices). Host controller 620 further comprises a CPU core 621, a serializer module 622, and a deserializer module 623. TMC 610 further comprises a deserializer module 612, a serializer module 613, a control module 614, a built-in self-test (BIST) module 615, a Joint Test Action Group (JTAG) IEEE 1149.1 standard test access port and boundary-scan architecture module 616, a switch module 617, an SSD port controller 670, a first DRAM memory controller 619$_1$, and a second DRAM memory controller 619$_2$. In certain uses herein, the term "transactional" relates to in-order or out-of-order instructions and/or commands or transactions having variable latency responses.

TMC 610 is coupled to host controller 620 through high speed serializer/deserializer (SerDes) links 130. Environment 600 shows TMC 610 coupled to a single host controller 620, but TMC 610 can be coupled to multiple host controllers in other embodiments. TMC 610 is further coupled to the plurality of DRAM devices 640 through standard physical interface 111 (e.g., JEDEC DDR4 SDRAM standard), wherein standard physical interface 111 can be a variety of interfaces selected according to the type of main memory technology (e.g., DRR4, DDR3, LPDDR3, etc.) implemented in environment 600. Environment 600 shows two DRAM memory controllers 619$_1$ and 619$_2$ coupled to the plurality of DRAM devices 640, but TMC 610 can support a plurality of memory controllers of various types coupled to a plurality of memory devices of various types in other embodiments. Environment 600 also shows flash memory 660 (e.g., NAND flash memory) coupled to TMC 610 through SSD controller 670, which functions as an intermediary controller for flash memory 660. Environment 600 shows TMC 610 comprising a single SSD port controller 618 coupled to a single SSD controller 670 and flash memory 660, but TMC 610 can support multiple SSD port controllers, multiple SSD controllers, and multiple flash memory devices in other embodiments. In some embodiments, TMC 610 can be coupled to other types of storage devices (e.g., SRAM storage, resistive storage, disk storage, etc.) and other types of functional devices (e.g., processors). In some embodiments, TMC 610 and surrounding components (e.g., 640$_1$, 640$_2$, 660, and 670) can comprise one device (e.g., system-on-chip or SoC), multiple devices in a single package or printed circuit board, multiple separate devices, and can have other variations, modifications, and alternatives.

TMC 610 receives from host controller 620 through SerDes link 630 command transactions in the form of packets. Deserializer module 612 receives the packets and can deskew, deserialize, and decode the content of the packet to determine the transaction type and the target of the transaction. Deserializer module 612 transmits the de-serialized and decoded transaction in the form of a command to switch module 617. Using additional routing information from control module 614 (e.g., configured by host controller 620), switch module 617 then routes or forwards the transaction to the appropriate target for the transaction, depending on the command type and the address of the transaction. For example, switch module 617 can route the transaction to one or more of DRAM memory controller 619$_1$, DRAM memory controller 619$_2$, or SSD port controller 618. Switch module further serves to route or forward return information (e.g., transaction results) to serializer 613 to packetize and serialize for transmission to host controller 620 through SerDes link 630. For example, if the transaction request is a read request, switch module 617 will route the transaction to the targeted DRAM memory controller or SSD port controller which will perform the read request and return the requested read data through switch module 617 back to the requestor (e.g., host controller 620) through serializer 613. BIST module 615 and JTAG module 616 further enable implementation and manufacturing of TMC 610 and associated higher level integrations (e.g., CDIMM, motherboard, etc.) by providing test and debug support.

Figure 7:
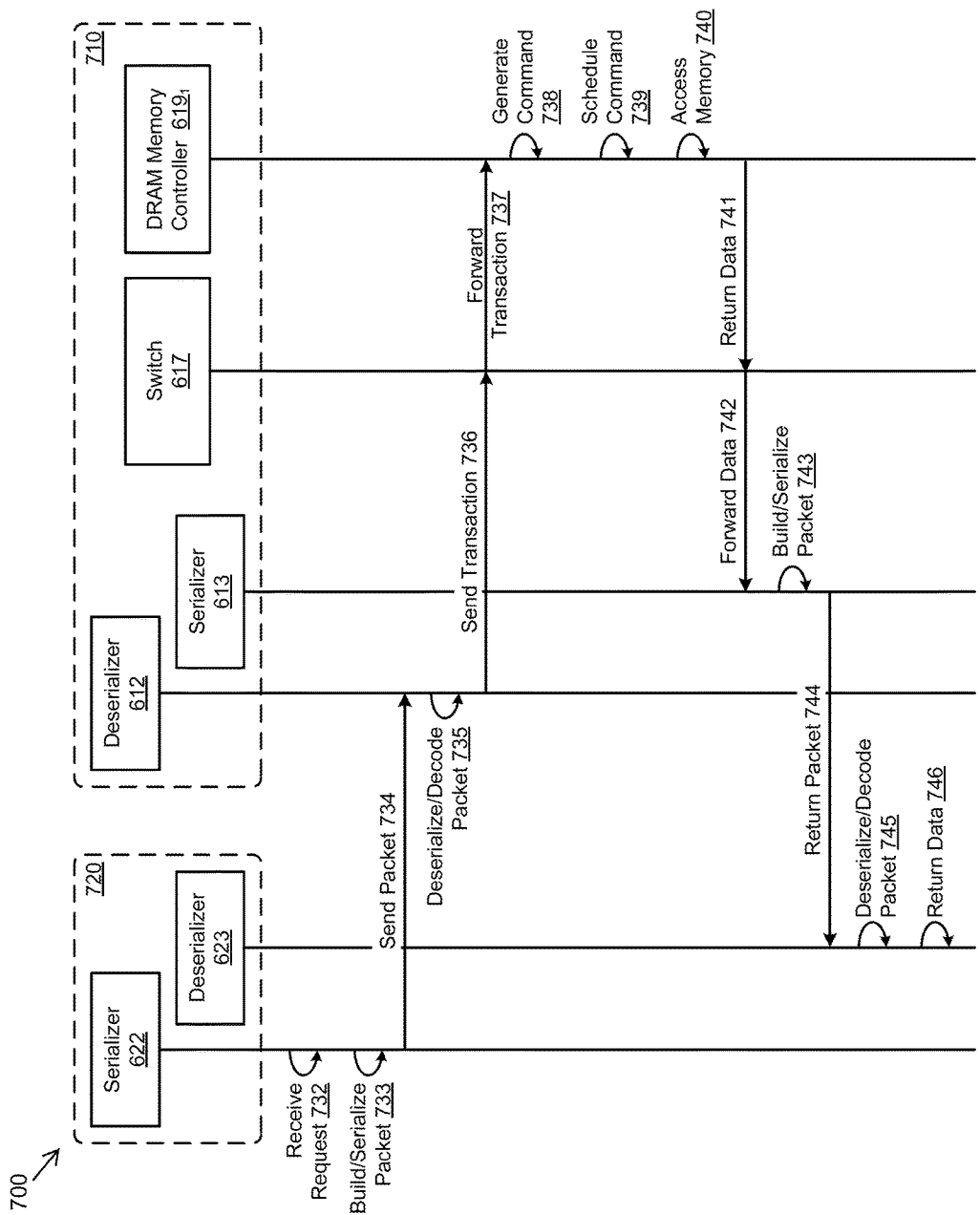
FIG. 7 depicts a diagram showing communications between a host controller and a transactional memory controller implemented as a near-memory compute module, according to one embodiment.

FIG. 7 depicts a diagram 700 showing communications between a host controller and a transactional memory controller implemented as a near-memory compute module. As an option, one or more instances of diagram 700 or any aspect thereof may be implemented in the context of the architecture and functionality of the embodiments described herein. Also, diagram 700 or any aspect thereof may be implemented in any desired environment.

As shown in FIG. 7, diagram 700 presents example operations and communications on and among host controller 620 and TCM 610 from environment 600 of FIG. 6 in some embodiments. Specifically, diagram 600 represents the operation of a transaction (e.g., request for data access) sent by host controller 620 to TCM 610 from which a result is returned. To illustrate this example operation, diagram 600 shows a first set of representative modules 720 comprising serializer 622 and deserializer 623 from host controller 620, and a second set of representative modules 710 comprising deserializer 612, serializer 613, switch 617, and DRAM memory controller 619$_1$ from TCM 610. The steps shown in diagram 700 can be modified, combined, or altered (e.g., steps added or removed) in other example and embodiments.

Modules 710 and 720, along with other associated computing and memory system components, can be designed and configured to enable serializer 622 to receive a request 732 (e.g., from CPU core 621 of host controller 620). Serializer 622 will build and serialize a packet 733 from request 732. Step build and serialize packet 733 can include sourcing a transaction tag for the transaction, constructing the packet with an appropriate command type, and generating cyclic redundancy check (CRC) bits, among other operations. The CRC bits provide protection of the integrity of the packet during the transmission of the packet. The transaction tag uniquely identifies a transaction for various purposes (e.g., when TMC 610 returns transaction results out of order). In some embodiments, the packet can be configured to contain atomic operations (e.g., test-and-set, etc.), enabling semaphore operations in a shared memory configuration with multiple host controllers. Step build and serialize packet 733 also includes serializing the packet data to allow serializer 622 to then send packet 734 (e.g., through SerDes link 630) to deserializer 612.

Deserializer 612 will then deserialize and decode packet 735. Step deserializer and decode packet 735 can include receiving the packet, de-skewing the packet, deserializing the packet, decoding the packet (e.g., for command, transaction, and routing information), and performing a CRC check of the packet, among other operations. Deserializer 612 will then send transaction 736 to switch 617 for routing or forwarding. Based on information included in send transaction 736 and other information (e.g., routing or forwarding information from control module 614), switch 617 will then forward transaction 737 to DRAM memory controller 619$_1$. DRAM memory controller 619$_1$ will then generate command 738, which can include performing a clock domain crossing, decoding the transaction, and generating a command sequence, among other operations. DRAM memory controller 619$_1$ will then schedule command 739 to access memory 740 (e.g., DRAM devices 640$_1$). DRAM memory controller 619$_1$ will then return data 741 from access memory 740 operation to switch 617 for return routing or forwarding. Step return data 741 can include checking for errors, correcting errors, and performing a clock domain crossing, among other operations. Switch 617 will then forward data 742 to serializer 613 to build and serialize packet 743. Step build and serialize packet 743 can include attaching the transaction tag associated with the data, constructing the packet in an appropriate format, and generating CRC bits, among other operations. Step build and serialize packet 743 also includes serializing the packet data to allow serializer 613 to then return packet 744 (e.g., through SerDes link 630) to deserializer 623. Deserializer 623 will then deserialize and decode packet 745. Step deserializer and decode packet 745 can include receiving the packet, deskewing the packet, deserializing the packet, decoding the packet (e.g., for command, transaction, and routing information), and performing a CRC check of the packet, among other operations. Deserializer 623 will then return data 746 (e.g., to CPU core 621 of host controller 620).

Figure 8:
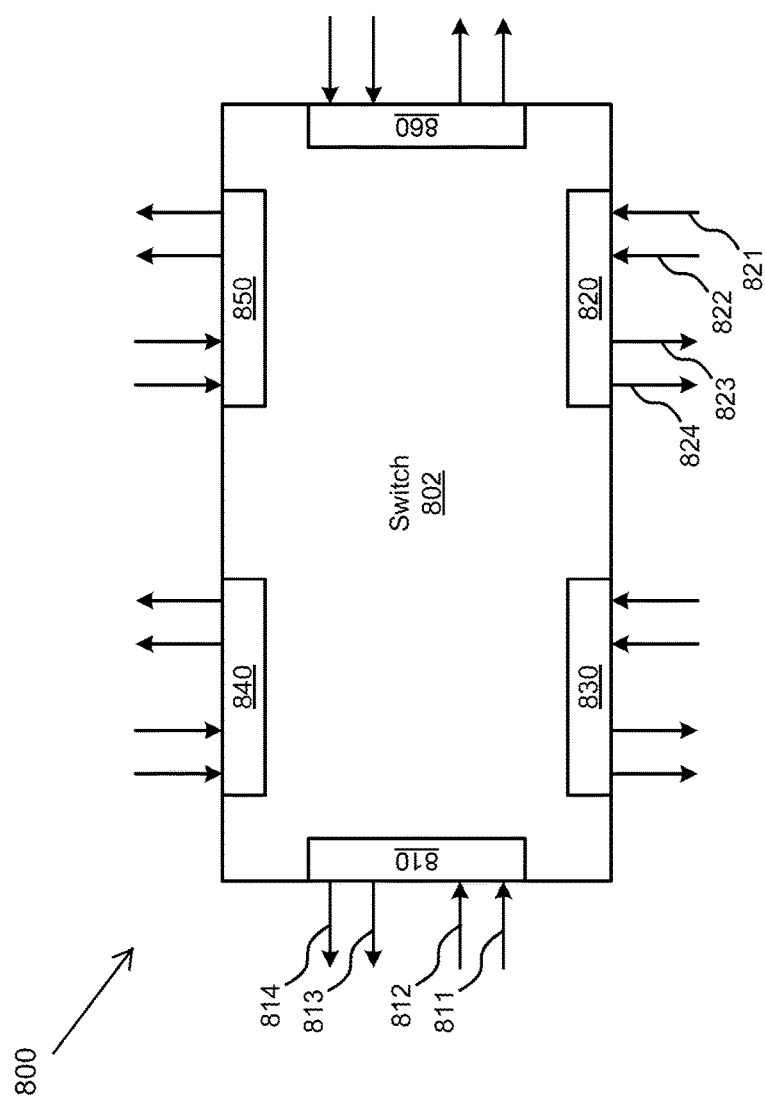
FIG. 8 is a block diagram of a switch module used in a transactional memory controller implemented as a near-memory compute module, according to one embodiment.

FIG. 8 is a block diagram 800 of a switch module used in a transactional memory controller implemented as a near-memory compute module. As an option, one or more instances of block diagram 800 or any aspect thereof may be implemented in the context of the architecture and functionality of the embodiments described herein. Also, block diagram 800 or any aspect thereof may be implemented in any desired environment.

As shown in FIG. 8, block diagram 800 comprises a switch module 802. In some embodiments, switch module 802 can replace switch module 617 in TMC 610 of environment 600 in FIG. 6. Switch 802 comprises a number of interface ports 810, 820, 830, 840, 850 and 860. Each interface port 810, 820, 830, 840, 850, and 860 further comprises a payload input port, a routing control port, a payload output port, and a payload output status port. For example, interface port 810 includes payload input port 811, routing control port 812, payload output port 813, and payload output status port 814. Similarly, interface port 820 includes payload input port 821, routing control port 822, payload output port 823, and payload output status port 824. Switch module 802 serves to deliver payload from one payload input port to another payload output port as selected by the routing control port. Additionally, data payloads routed through switch module 802 can also include one or more transaction IDs that can be used for further processing (e.g., completion of the transaction sequence). For example, a data payload with transaction ID FOO is provided on payload input port 811 and routing information is provided on routing control port 812 such that payload output port 823 is selected to receive the data payload. Switch module 802 then routes the data payload to payload output port 823 and provides a status of the data payload on payload output status port 824. The object that had received the data payload with transaction ID FOO on output port 823 may return status or data from the payload input port 821 and provide the routing information on routing control port 822 to return the data or status to interface port 810 with the same transaction ID FOO.

Figure 9:
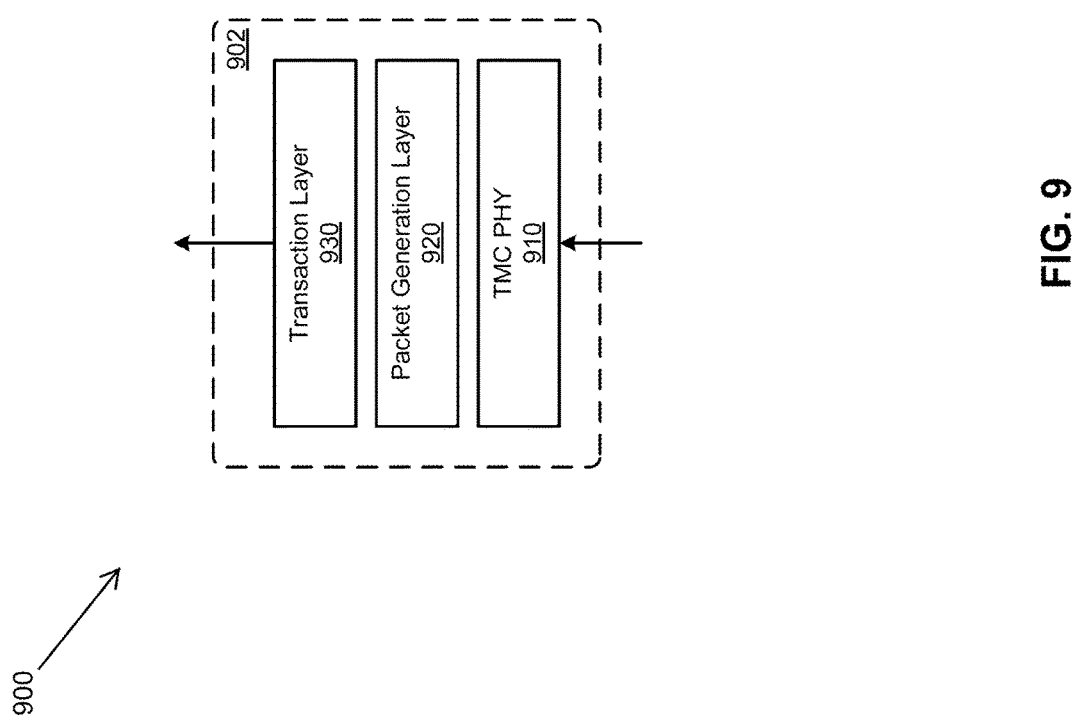
FIG. 9 is a functional layer diagram of a deserializer module used in a transactional memory controller implemented as a near-memory compute module, according to one embodiment.

FIG. 9 is a functional layer diagram 900 of a deserializer module used in a transactional memory controller implemented as a near-memory compute module. As an option, one or more instances of diagram 900 or any aspect thereof may be implemented in the context of the architecture and functionality of the embodiments described herein. Also, the diagram 900 or any aspect thereof may be implemented in any desired environment.

As shown in FIG. 9, functional layer diagram 900 comprises a deserializer module 902. In some embodiments, deserializer 902 can replace deserializer 612 in TMC 610 of environment 600 in FIG. 6. Deserializer 902 comprises a TMC PHY layer 910, a transactional packet generation layer 920, and a transaction layer 930. TMC PHY layer 910 provides the physical interface for signals presented by components external to a TMC (e.g., signals from host controller 620 on SerDes link 630). Transactional packet generation layer 920 performs various operations (e.g., CRC checking, error handling, NAK processing, tag sourcing, destination routing construction, etc.) and builds the data payload for processing by transaction layer 930.

Figure 10:
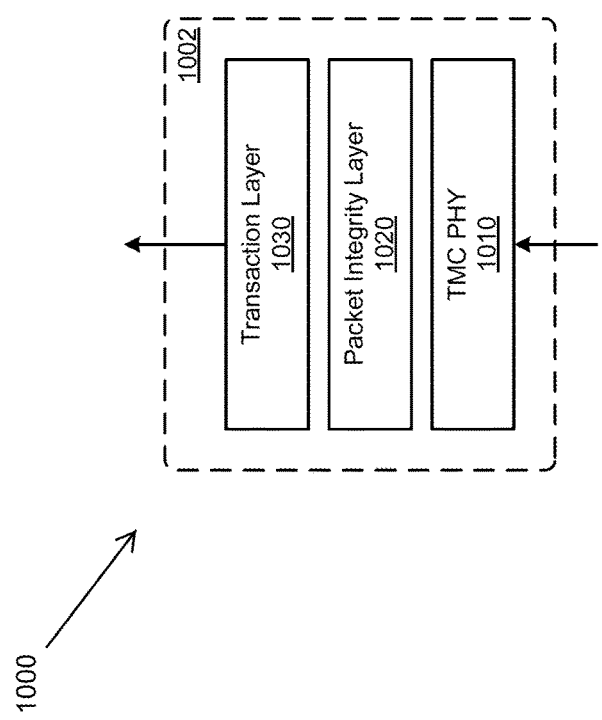
FIG. 10 is a functional layer diagram of a serializer module used in a transactional memory controller implemented as a near-memory compute module, according to one embodiment.

FIG. 10 is a functional layer diagram 1000 of a serializer module used in a transactional memory controller implemented as a near-memory compute module. As an option, one or more instances of diagram 1000 or any aspect thereof may be implemented in the context of the architecture and functionality of the embodiments described herein. Also, diagram 1000 or any aspect thereof may be implemented in any desired environment.

As shown in FIG. 10, functional layer diagram 1000 comprises a serializer module 1002. In some embodiments, serializer 1002 can replace serializer 613 in TMC 610 of environment 600 in FIG. 6. Serializer 1002 comprises a TMC PHY layer 1010, a transactional packet integrity layer 1020, and a transaction layer 1030. TMC PHY layer 1010 provides the physical interface for signals delivered to components external to a TMC (e.g., signals to host controller 620 on SerDes link 630). Transactional packet integrity layer 1020 performs various operations (e.g., CRC generation, tag sourcing, destination routing construction, etc.) of the data payload.

Figure 11:
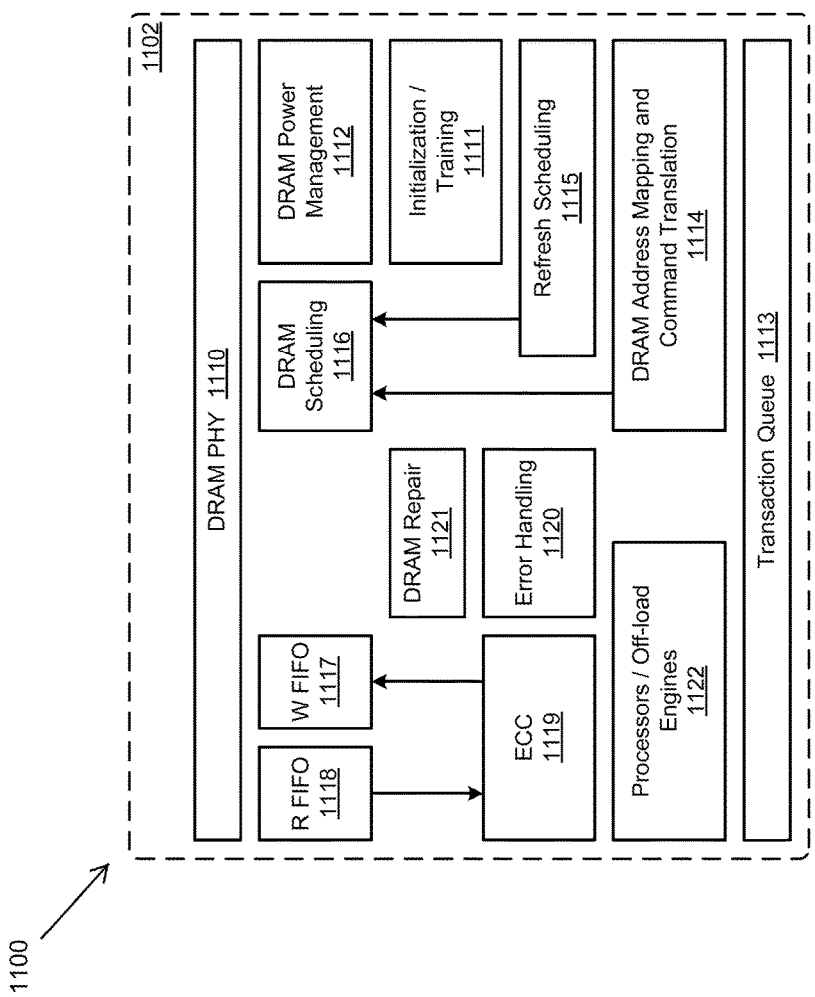
FIG. 11 is a block diagram of a DRAM memory controller used in a transactional memory controller implemented as a near-memory compute module, according to one embodiment.

FIG. 11 is a block diagram 1100 of a DRAM memory controller used in a transactional memory controller implemented as a near-memory compute module. As an option, one or more instances of block diagram 1100 or any aspect thereof may be implemented in the context of the architecture and functionality of the embodiments described herein. Also, block diagram 1100 or any aspect thereof may be implemented in any desired environment.

As shown in FIG. 11, block diagram 1100 comprises a DRAM memory controller 1102. In some embodiments, DRAM memory controller 1102 can replace DRAM memory controllers 619$_1$ and/or 619$_2$ in TMC 610 of environment 600 in FIG. 6. DRAM memory controller 1102 further comprises a DRAM PHY module 1110, a DRAM initialization and training module 1111, a DRAM power management module 1112, a transaction queue module 1113, a DRAM address mapping and command translation module 1114, a refresh scheduling module 1115, a DRAM scheduling module 1116, a write FIFO 1117, a read FIFO 1118, an error checking and correction (ECC) module 1119, an error handling module 1120, a DRAM repair component 1121, and a near-memory compute module 1122.

DRAM PHY module 1110 interfaces with DRAM devices and is also closely coupled to a DRAM initialization and training module 1111 and a DRAM power management module 1112. DRAM power management module 1112 can be configured to autonomously manage the state (e.g., power state) of the coupled DRAM devices based on the transactions received at controller 1102 or sensed at any point in the memory system (e.g., deserializer 612 of TMC 610). Transaction queue module 1113 receives and manages transactions sent to DRAM memory controller 1102. DRAM address mapping and command translation module 1114 maps and decodes the transactions into DRAM commands. Refresh scheduling module 1115 generates DRAM refresh commands and DRAM scheduling module 1116 queues and schedules DRAM commands as needed. Write FIFO 1117 sends data through DRAM PHY module 1110 to the DRAM devices, and read FIFO 1118 receives data through DRAM PHY module 1110 from the DRAM devices. Error checking and correction module 1119 checks received data for errors (e.g., single error correction or multi-error correction). If errors are discovered, error handling module 1120 logs and handles the errors. If DRAM repair is needed (e.g., based on error history recorded by module 1120), DRAM repair component 1121 can repair faulty DRAM cells, blocks or devices.

Additional Embodiments

Various additional embodiments are disclosed below. Aspects of the embodiments can be combined. For example, embodiment 1 can include aspects of embodiment 2 and aspects of embodiment 3.

Embodiment 1

A transactional memory interface integrated circuit device comprising:
- a deserializer module coupled to the switch module and configured to receive the packet in a serial format and to process the packet to convert the serial format into a parallel format, the packet comprising at least command information;
- a switch module configured to communicate to a host CPU using at least the packet including a tag and payload, and configured to route the packet to one of a plurality of devices or modules;
- a control module coupled to the switch module, and the deserializer module, and configured to process communications between the plurality of devices or modules, without interacting with the host CPU; and
- a memory controller configured to the switch module, the memory controller being configured to process the packet to be compatible with a selected memory device.

Embodiment 2

The device of embodiment 1 wherein one of the plurality of devices is selected from a DRAM device, a Flash device, an SRAM storage module, a resistive memory device, a storage device, or a processing module.

Embodiment 3

The device of embodiment 1 wherein the deserializer module comprises a PHY layer, a packet integrity module, and a transactional layer.

Embodiment 4

The device of embodiment 1 wherein the memory controller is a DRAM memory controller, a Flash Memory controller, or other memory controller.

Embodiment 5

The device of embodiment 1 wherein the memory controller comprises a plurality of memory controller, each of which is configured to communicate with a plurality of DRAM devices.

Embodiment 6

The device of embodiment 1 wherein the memory controller comprises a plurality of memory controller, each of which is configured to communicate with a plurality of memory devices.

Embodiment 7

The device of embodiment 1 wherein the memory controller comprises a plurality of DRAM memory controllers, each of which is configured to communicate with a plurality of DRAM devices, and a plurality of Flash memory controllers, each of which is configured to communicate with a plurality of Flash memory devices.

Embodiment 8

The device of embodiment 1 wherein the host CPU is coupled to a serializer module, the serializer module being configured to create a packet with command information and process the packet from a parallel format to the serial format to be transferred via a high speed communication channel to the deserializer module.

Embodiment 9

The device of embodiment 1 further comprising a system board configured for placement of the integrated circuit device.

Embodiment 10

The device of embodiment 1 wherein the memory controllers are configured to autonomously manage each power state of the coupled memory devices depending on an access pattern of a plurality of packets received by the deserializer module.

Embodiment 11

The device of embodiment 10 wherein each of the memory devices are in standby states and is ready for an immediate access.

Embodiment 12

The device of embodiment 10 wherein each of the memory devices is in a power-down state until at least one of the plurality of packets is received by the deserializer module.

Embodiment 13

The device of embodiment 10 wherein each of the memory devices is in a power down state until at least one of the plurality of packets is received by the deserializer module and thereafter a selected set of memory devices is in a stand-by state based upon at least one of the plurality of packets.

Embodiment 14

The device of embodiment 1 wherein the memory controller is configured to provide a single or multi-error detection and correction process.

Embodiment 15

The device of embodiment 14 wherein the single or multiple error detection and correction process is configured to store an error condition to accumulate a history of a plurality of error occurrences and based on the history of at least one or more error occurrences, configured to initiate a memory repair process.

Embodiment 16

The device of embodiment 1 wherein the host CPU is configured to process one or more packets to configure the control module.

Embodiment 17

The device of embodiment 1 wherein the host CPU is configured to process one or more packets to configure the control module and effect processing of data.

Embodiment 18

The device of embodiment 1 further comprising an additional host CPU or a plurality of other host CPUs coupled to the device.

Embodiment 19

The device of embodiment 18 wherein the packet is configured to contain a conditional atomic operation selected from at least one of a Test-and-Set, an enabling semaphore operations in a shared memory configuration with multiple hosts.

In the foregoing specification, the disclosure has been described with reference to specific embodiments thereof. It will, however, be evident that various modifications and changes may be made thereto without departing from the broader spirit and scope of the disclosure.

Finally, it should be noted that there are alternative ways of implementing the embodiments disclosed herein. Accordingly, the present embodiments are to be considered as illustrative and not restrictive, and the claims are not to be limited to the details given herein, but may be modified within the scope and equivalents thereof.

What is claimed is:

1. An integrated circuit device disposed within an integrated circuit package having a periphery, the integrated circuit device within the periphery comprising:
   a transaction processor; and
   one or more memory controllers coupled to the transaction processor, the one or more memory controllers to execute one or more memory access operations, wherein a plurality of DRAM devices is coupled to the one or more memory controllers, the plurality of DRAM devices to respond to the one or more memory access operations, wherein the transaction processor is to:
   receive a combination of signals from a host controller;
   intercept a first portion of the combination of signals;
   decode a command in the first portion;
   determine, based on the command, a set of one or more instructions to perform a data transformation of data in a memory by the transaction processor;
   execute the set of instructions to perform the data transformation during one or more wait times after the first portion of the combination of signals is intercepted and before operation results from the data transformation are expected by the host controller;
   determine operation results from the set of instructions;
   decode a second portion of the combination of signals;
   forward the second portion of the combination of signals to be used by the one or more memory controllers to initiate execution of a write access operation or a read access operation of the one or more memory access operations; and
   when the second portion corresponds to the write access operation, receive write data associated with the write access operation from the host controller and forward the write data to the one or more memory controllers; and
   when the second portion corresponds to the read access operation, receive read data associated with the read access operation from the one or more memory controllers and forward the read data during one or more wait times after the first portion of the combination of signals is intercepted and before operation results from the data transformation are expected by the host controller to the host controller,
   wherein the transaction processor comprises a set of data buffers to drive and receive the combination of signals and allow the plurality of DRAM devices to emulate a type of Dual In-Line Memory Module (DIMM) selected from an un-buffered DIMM type (UDIMM), a load-reduction DIMM type (LRDIMM), and a registered DIMM type (RDIMM).

2. The integrated circuit device of claim 1, wherein the transaction processor is to communicate with a host controller using a physical interface so as to appear as a physical memory, wherein the physical memory comprises one or more of the plurality of DRAM devices.

3. The integrated circuit device of claim 1, further comprising the plurality of DRAM devices.

4. The integrated circuit device of claim 3, wherein the transaction processor is to communicate with a host controller using a physical interface so as to appear as a physical memory, the physical memory being one or more of the plurality of DRAM devices.

5. The integrated circuit device of claim 1, wherein the transaction processor comprises a control plane to decode one or more commands from the first portion.

6. The integrated circuit device of claim 5, wherein the transaction processor comprises a data plane to store a software driver payload and accept the commands from the control plane to execute the data transformation.

7. The integrated circuit device of claim 6, wherein the control plane and the data plane are implemented with Static Random Access Memory (SRAM).

8. The integrated circuit device of claim 1, further comprising one or more off-load engines coupled to the transaction processor, wherein the transaction processor is to launch a data transformation operation on the off-load engines to perform the data transformation.

9. The integrated circuit device of claim 8, further comprising one or more processor cores coupled to the one or more off-load engines, wherein the transaction processor is to use the one or more processor cores and the one or more processor cores to accelerate the execution of the data transformation.

10. A near memory computing system comprising:
    a transaction processor;
    a plurality of dynamic random access memory (DRAM) devices; and
    at least one memory controller coupled to the transaction processor and the plurality of DRAM devices, the memory controller to perform one or more memory access operations over at least some of the plurality of DRAM devices, the memory controller further to perform an error detection and correction process by storing an error condition to accumulate a history of a plurality of error occurrences and initiating a memory repair process based on the history;
wherein the transaction processor is to receive a combination of signals from the at least one memory controller, and wherein the transaction processor intercepts a first portion of the combination of signals, decode a command in the first portion; determine, based on the command, a set of one or more instructions to perform a data transformation of data in a memory by the transaction processor, execute the set of instructions to perform the data transformation during one or more wait times after the first portion of the combination of signals is intercepted and before operation results from the data transformation are expected by the at least one memory controller, determine operation results from the set of instructions, decode a second portion of the combination of signals, and forward the second portion of the combination of signals to initiate execution of a write access operation or a read access operation of the one or more memory access operations, wherein:
when the second portion corresponds to the write access operation, the transaction processor is to receive write data associated with the write access operation from the at least one memory controller and forward the write data to the plurality of DRAM devices; and
when the second portion corresponds to the read access operation, the transaction processor is receive read data associated with the read access operation from the plurality of DRAM devices and forward the read data and the operation results to the at least one memory controller.

11. The system of claim 10, wherein the transaction processor is to communicate with a host controller using a physical interface so as to appear as a physical memory, the physical memory being one or more of the plurality of DRAM devices.

12. The system of claim 10, wherein the transaction processor comprises a control plane to decode one or more commands from the first portion.

13. The system of claim 12, wherein the transaction processor comprises a data plane to store a software driver payload and accept the commands from the control plane to execute the data transformation.

14. The system of claim 10, wherein the transaction processor comprises a set of data buffers to drive and receive the combination of signals.

15. The system of claim 10, further comprising one or more off-load engines coupled to the transaction processor, wherein the transaction processor is to launch a data transformation operation on the one or more off-load engines to perform the data transformation.

16. The system of claim 15, further comprising one or more processor cores coupled to the one or more off-load engines and configured to accelerate the execution of the data transformation.

17. The system of claim 10, further comprising one or more flash controllers coupled to one or more flash memory devices.

18. The system of claim 10, further comprising one or more off-load engines coupled to the transaction processor, the off-load engines to perform the data transformation.

19. The system of claim 18, further comprising one or more processor cores coupled to the one or more off-load engines, wherein the transaction processor is to use the one or more processor cores and the one or more processor cores to accelerate the execution of the data transformation.

* * * * *